United States Patent
Zhao

(10) Patent No.: US 12,498,972 B2
(45) Date of Patent: Dec. 16, 2025

(54) METHOD FOR CONTROLLING TIME-LIMITED USE OF APPLICATION, AND ELECTRONIC DEVICE

(71) Applicant: Honor Device Co., Ltd., Shenzhen (CN)

(72) Inventor: Zhao Zhao, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 436 days.

(21) Appl. No.: 18/031,048

(22) PCT Filed: Jan. 18, 2022

(86) PCT No.: PCT/CN2022/072549
§ 371 (c)(1),
(2) Date: Apr. 10, 2023

(87) PCT Pub. No.: WO2022/206130
PCT Pub. Date: Oct. 6, 2022

(65) Prior Publication Data
US 2023/0367634 A1    Nov. 16, 2023

(30) Foreign Application Priority Data

Mar. 31, 2021    (CN) .......................... 202110349196.5

(51) Int. Cl.
*G06F 9/48* (2006.01)
*G06F 3/04817* (2022.01)
(Continued)

(52) U.S. Cl.
CPC ........ *G06F 9/4887* (2013.01); *G06F 3/04817* (2013.01); *G06F 3/0482* (2013.01); *G06F 9/542* (2013.01)

(58) Field of Classification Search
CPC .. G06F 3/0488; G06F 3/0482; G06F 3/04883; G06F 9/4837; G06F 9/48; G06F 9/4806; H04M 1/72586
See application file for complete search history.

(56) References Cited

U.S. PATENT DOCUMENTS 9,270,674 B2    2/2016  Lang et al.
10,558,546 B2 *  2/2020  Cranfill ................. H04L 63/102
(Continued)

FOREIGN PATENT DOCUMENTS

CN    103383628 A    11/2013
CN    105379223 A    3/2016
(Continued)

*Primary Examiner* — Andy Ho
(74) *Attorney, Agent, or Firm* — Slater Matsil, LLP

(57) ABSTRACT

A method for controlling time-limited use of an application is provided. The electronic device displays a first main interface including a first icon of a first application and a second icon of a second application, where a preset mark is displayed at a preset position for the second icon; and the second application is an application that needs to be controlled for use while the first application does not; a shortcut menu of the second application is displayed on the first main interface in response to a first operation on the second icon, and the shortcut menu includes a first control; a second interface is displayed in response to a click operation on the first control; a first delay time set by a user on the second interface is received, and a first prompt message is sent when the first delay time arrives.

20 Claims, 19 Drawing Sheets

(51) Int. Cl.
   *G06F 3/0482*   (2013.01)
   *G06F 9/54*     (2006.01)

(56) References Cited

U.S. PATENT DOCUMENTS

| | | |
|---|---|---|
| 10,972,476 B2 | 4/2021 | Jing et al. |
| 11,467,723 B2 * | 10/2022 | Li .......................... G06F 3/0482 |
| 2014/0073305 A1 | 3/2014 | Benjamin |
| 2014/0344951 A1 | 11/2014 | Brewer |
| 2016/0112497 A1 | 4/2016 | Koushik et al. |
| 2019/0065240 A1 | 2/2019 | Kong et al. |
| 2019/0347180 A1 | 11/2019 | Cranfill et al. |

FOREIGN PATENT DOCUMENTS

| | | |
|---|---|---|
| CN | 106940652 A | 7/2017 |
| CN | 108304108 A | 7/2018 |
| CN | 108984243 A | 12/2018 |
| CN | 110266875 A | 9/2019 |
| CN | 111240620 A | 6/2020 |
| CN | 111240624 A | 6/2020 |
| CN | 112732535 A | 4/2021 |
| EP | 3349510 A1 | 7/2018 |
| WO | 2017161499 A1 | 9/2017 |

* cited by examiner

METHOD FOR CONTROLLING TIME-LIMITED USE OF APPLICATION, AND ELECTRONIC DEVICE

CROSS-REFERENCE TO RELATED APPLICATIONS

This application is a national stage of International Application No. PCT/CN2022/072549, filed on Jan. 18, 2022, which claims priority to Chinese Patent Application No. 202110349196.5, filed on Mar. 31, 2021. The disclosures of both of the aforementioned applications are hereby incorporated by reference in their entireties.

TECHNICAL FIELD

This application relates to the field of terminal technologies, and in particular, to a method for controlling time-limited use of an application, and an electronic device.

BACKGROUND

With development of electronic devices such as mobile phones, more and more applications (applications, APPs) occupy a large amount of fragmented time of users. For example, occupancy of entertainment APPs such as chat apps and game apps is particularly prominent.

In the conventional technology, occupancy of user time by these APPs is generally controlled by limiting service time of an entire device. This control mode is highly restrictive, which is unfavorable for targeted control of a single APP.

Alternatively, in some other manners, control may be made for a single APP. For example, an electronic device may receive a setting operation of a user on one or more applications at an application management center to restrict the user from using the one or more applications. For another example, the electronic device may receive a setting operation of the user at a setting center of a single APP to restrict the user from using the application. The application management center or the setting center of a single APP, as described above, may provide a teenage mode for selection by the user, so as to restrict the user from using a corresponding application. However, this control method is not different for each APP, and requires the user to perform complex setting operations.

In conclusion, existing control methods are not highly targeted, and control effect needs to be improved; and complex user operations are required, which increases difficulty of control operations.

SUMMARY

Embodiments of this application provide a method for controlling time-limited use of an application, and an electronic device, so as to simplify a user operation of triggering time-limited use of a control application in the electronic device, and provide a user with an intelligent and convenient control experience.

According to a first aspect, an embodiment of this application provides a method for controlling time-limited use of an application. The method may be applied to an electronic device, and a plurality of applications are installed in the electronic device. The electronic device may display a first main interface including a first icon and a second icon, where the first icon is an application icon of a first application, and the second icon is an application icon of a second application. A preset mark is displayed at a preset position for the second icon on the first main interface, and the preset mark is used to indicate timeout of the second application. That is, the electronic device can distinguish timeout applications (that is, to be controlled for use) on the first main interface. The electronic device displays a shortcut menu of the second application on the first main interface in response to a first operation of a user on the second icon, where the first operation is a long-press operation or a double-click operation. Unlike a conventional shortcut menu, the shortcut menu of the second application includes a first control for triggering the electronic device to set a delay time for the second application. The electronic device displays a second interface in response to a click operation by the user on the first control; and the electronic device receives a first delay time set by the user on the second interface. Briefly, the electronic device may provide the user with a time-limited setting function by using the first control in the shortcut menu. The electronic device sends a first prompt message when the first delay time arrives, where the first prompt message is used to prompt that the second application has been delayed for the first delay time.

The second application is determined by the electronic device from the plurality of applications based on running records and application types of the plurality of applications; the application types include office applications and non-office applications, and the running records include a running time and/or a quantity of running times of a corresponding application in the foreground of the electronic device in a preset time period as of a current time; the second application is a non-office application whose running time and/or quantity of running times in the foreground exceeds a preset threshold; and the first application is an application other than the second application among the plurality of applications. That is, the electronic device can intelligently identify the second application that needs to be controlled for use and the first application that does not need to be controlled for use.

In conclusion, by using the method according to this embodiment of this application, the electronic device can intelligently identify an application that needs to be controlled for use, and the user can visually distinguish the application that needs to be controlled for use on the main interface of the electronic device. The shortcut menu of the second application includes the first control, and the first control can easily provide the user with a function of setting a delay time for the application that needs to be controlled for use, so as to reduce difficulty in setting the delay time by the user while implementing targeted setting. An intelligent timeout prompt service is provided to the user when the set delay time arrives.

In a possible design manner of the first aspect, the second interface is a main interface of the electronic device, and the second interface includes a delay setting window for setting a delay time; or the second interface is an application interface of the second application, and the second interface includes a delay setting window for setting a delay time. That the electronic device receives a first delay time set by the user on the second interface may include: the electronic device receives the first delay time set by the user in the delay setting window.

That is, by using the method according to this embodiment of this application, after the user triggers the first control, the delay setting window can be directly provided to the user to set a delay time, so as to improve convenience of triggering setting of a time.

In another possible design manner of the first aspect, for a time period before any application is identified as an application that needs to be controlled for use, the second application may not have timed out, and therefore is an application that does not need to be controlled for use. In this case, before the electronic device displays the first main interface, the method further includes: the electronic device displays a second main interface, where the second main interface includes the second icon, and the preset mark is not displayed at a preset position for the second icon on the second main interface; the electronic device displays an application interface of the second application in response to a click operation by the user on the second icon on the second main interface; and the electronic device displays a third interface if a running time and/or a quantity of running times of the second application in the foreground in the preset time period as of the current time exceeds the preset threshold when the second application is running in the foreground, where the third interface is used to prompt timeout of the second application.

That is, for any application, before the application is identified as an application that needs to be controlled for use, the application is run in the foreground in response to a click operation by the user on the application. During running in the foreground, if the application is identified as an application that needs to be controlled for use, the user may be prompted of timeout of the application. In this way, for an application identified as an application that needs to be controlled for use during running in the foreground, after the application is identified as an application that needs to be controlled for use, the application interface prompts the user of timeout, so as to improve timeliness of control for use.

Thereafter, that the electronic device displays a first main interface includes: the electronic device displays the first main interface in response to a second operation of the user, where the second operation is used to trigger the electronic device to run the second application in the background and to display the main interface of the electronic device.

That is, after the electronic device is triggered to run the second application in the background, the first main interface is displayed, and subsequently, setting of a delay time and control for use can be implemented by using the first control in the shortcut menu.

In another possible design manner of the first aspect, the third interface includes a delay setting window for setting a delay time; and the method further includes: the electronic device may receive a second delay time set by the user in the delay setting window on the third interface; and the electronic device sends a second prompt message when the second delay time arrives, where the second prompt message is used to prompt that the second application has been delayed for the second delay time.

That is, by using the method according to this embodiment of this application, for an application identified as an application that needs to be controlled for use during running in the foreground, the user may be provided with a delay setting function, so as to improve timeliness of time-limited control.

In another possible design manner of the first aspect, that the electronic device determines the second application from the plurality of applications based on use records and application types of the plurality of applications include: the electronic device obtains an application type of each of the plurality of applications from a cloud server, where the application types include office applications and non-office applications; the electronic device counts a running time and/or a quantity of running times of each non-office application among the plurality of applications in the foreground in the preset time period; and if a running time and/or a quantity of running times of a first non-office application among the plurality of applications in the foreground in the preset time period as of the current time exceeds the preset threshold, the first non-office application is determined to be the second application, where the first non-office application is any one of non-office applications among the plurality of applications.

That is, by using the method according to this embodiment of this application and in combination with use records and application types of the applications, among the plurality of applications, a non-office application whose running time and/or quantity of running times in the foreground in the preset time period as of the current time exceeds the preset threshold is determined as the second application, so that the determined second application is a timeout non-office application, and then, control for use can be implemented for this second application, thereby further making control for use more targeted.

In another possible design manner of the first aspect, that the running time and/or the quantity of running times exceeds the preset threshold includes: the running time exceeds a preset threshold; and/or the quantity of running times exceeds a preset threshold.

That is, by using the method according to this embodiment of this application, "timeout" can be measured by using one or both of the preset time threshold and the preset times threshold to accurately determine a timeout application.

In another possible design manner of the first aspect, the electronic device may further display a shortcut menu of the first application on the first main interface in response to the first operation by the user on the first icon. However, unlike the electronic device in response to the first operation by the user on the second icon, the shortcut menu of the first application does not include a control for triggering the electronic device to set a delay time for the first application.

That is, by using the method according to this embodiment of this application, also in response to the long-press operation or the double-click operation by the user on the application icon, but the shortcut menu of the first application does not include a control for triggering the electronic device to set a delay time for the first application, then the electronic device can prevent the user from operating the control for triggering the electronic device to set a delay time for the first application to trigger setting of the delay time for the first application. In this way, control for use of applications may satisfy actual running records and application types of the applications, so as to achieve differentiation of control for use.

According to a second aspect, an embodiment of this application further provides an electronic device. A plurality of applications are installed in the electronic device, and the electronic device includes a display, a memory, and one or more processors. The display and the memory are coupled to the processor. The memory is configured to store computer program code, the computer program code includes a computer instruction, and when the computer instruction is executed by the processor, the electronic device is enabled to perform the following steps: displaying a first main interface, where the first main interface includes a first icon and a second icon, the first icon is an application icon of a first application, the second icon is an application icon of a second application, a preset mark is displayed at a preset position for the second icon on the first main interface, and the preset mark is used to indicate timeout of the second application; displaying a shortcut menu of the second application on the first main interface in response to a first operation of a user on the second icon, where the shortcut menu of the second application includes a first control, the first control is used to trigger the electronic device to set a delay time for the second application, and the first operation is a long-press operation or a double-click operation; displaying a second interface in response to a click operation by the user on the first control; receiving a first delay time set by the user on the second interface; and sending a first prompt message when the first delay time arrives, where the first prompt message is used to prompt that the second application has been delayed for the first delay time.

The second application is determined by the processor from the plurality of applications based on running records and application types of the plurality of applications; the application types include office applications and non-office applications, and the running records include a running time and/or a quantity of running times of a corresponding application in the foreground of the electronic device in a preset time period as of the current time; the second application is a non-office application whose running time and/or quantity of running times in the foreground exceeds a preset threshold; and the first application is an application other than the second application among the plurality of applications.

In another possible design manner of the second aspect, the second interface is a main interface of the electronic device, and the second interface includes a delay setting window for setting a delay time. Alternatively, the second interface is an application interface of the second application, and the second interface includes a delay setting window for setting a delay time.

When the computer instruction is executed by the processor, the electronic device is enabled to further perform the following step: receiving the first delay time set by the user in the delay setting window.

In another possible design manner of the second aspect, when the computer instruction is executed by the processor, the electronic device is enabled to further perform the following steps: displaying a second main interface before displaying the first main interface, where the second main interface includes the second icon, and the preset mark is not displayed at a preset position for the second icon on the second main interface; displaying an application interface of the second application in response to a click operation by the user on the second icon on the second main interface; and displaying a third interface if a running time and/or a quantity of running times of the second application in the foreground in the preset time period as of the current time exceeds the preset threshold when the second application is running in the foreground, where the third interface is used to prompt timeout of the second application.

When the computer instruction is executed by the processor, the electronic device is enabled to further perform the following step: displaying, by the electronic device, the first main interface in response to a second operation of the user, where the second operation is used to trigger the electronic device to run the second application in the background and to display the main interface of the electronic device.

In another possible design manner of the second aspect, the third interface includes a delay setting window for setting a delay time. When the computer instruction is executed by the processor, the electronic device is enabled to further perform the following steps: receiving a second delay time set by the user in the delay setting window on the third interface; and sending a second prompt message when the second delay time arrives, where the second prompt message is used to prompt that the second application has been delayed for the second delay time.

In another possible design manner of the second aspect, when the computer instruction is executed by the processor, the electronic device is enabled to further perform the following steps: obtaining an application type of each of the plurality of applications from a cloud server, where the application types include office applications and non-office applications; counting a running time and/or a quantity of running times of each non-office application among the plurality of applications in the foreground in the preset time period; and if a running time and/or a quantity of running times of a first non-office application among the plurality of applications in the foreground in the preset time period as of the current time exceeds the preset threshold, determining that the first non-office application is the second application, where the first non-office application is any one of non-office applications among the plurality of applications.

In another possible design manner of the second aspect, that the running time and/or the quantity of running times exceeds the preset threshold includes: the running time exceeds a preset threshold; and/or the quantity of running times exceeds a preset threshold.

In another possible design manner of the second aspect, when the computer instruction is executed by the processor, the electronic device is enabled to further perform the following step: after displaying the first main interface, displaying a shortcut menu of the first application on the first main interface in response to the first operation by the user on the first icon, where the shortcut menu of the first application does not include a control for triggering the electronic device to set a delay time for the first application.

According to a third aspect, an embodiment of this application provides a chip system, where the chip system is applied to an electronic device including a display and a memory; the chip system includes one or more interface circuits and one or more processors; the interface circuit and the processor are interconnected through lines; the interface circuit is configured to receive a signal from the memory of the electronic device and send the signal to the processor, where the signal includes a computer instruction stored in the memory; and when the processor executes the computer instruction, the electronic device performs the method according to the first aspect and any one of the possible design manners.

According to a fourth aspect, this application provides a computer storage medium, where the computer storage medium includes a computer instruction, and when the computer instruction is run on an electronic device, the electronic device is enabled to perform the method according to the first aspect and any one of the possible design manners.

According to a fifth aspect, this application provides a computer program product. When the computer program product runs on a computer, the computer is enabled to perform the method according to the first aspect and any one of the possible design manners.

It can be understood that for beneficial effects to be achieved by the electronic device according to the second aspect, the chip system according to the third aspect, the computer storage medium according to the fourth aspect, and the computer program product according to the fifth aspect, reference may be made to the beneficial effects in the first aspect and any one of the possible design manners, and details are not repeated herein.

DETAILED DESCRIPTION OF ILLUSTRATIVE EMBODIMENTS

The following terms "first" and "second" are merely used for description, but should not be understood as indicating or implying relative importance or implying a quantity of indicated technical features. Therefore, a feature limited by "first" or "second" may explicitly or implicitly include one or more features. In descriptions of embodiments, unless otherwise stated, "a plurality of" means two or more.

Figure 1:
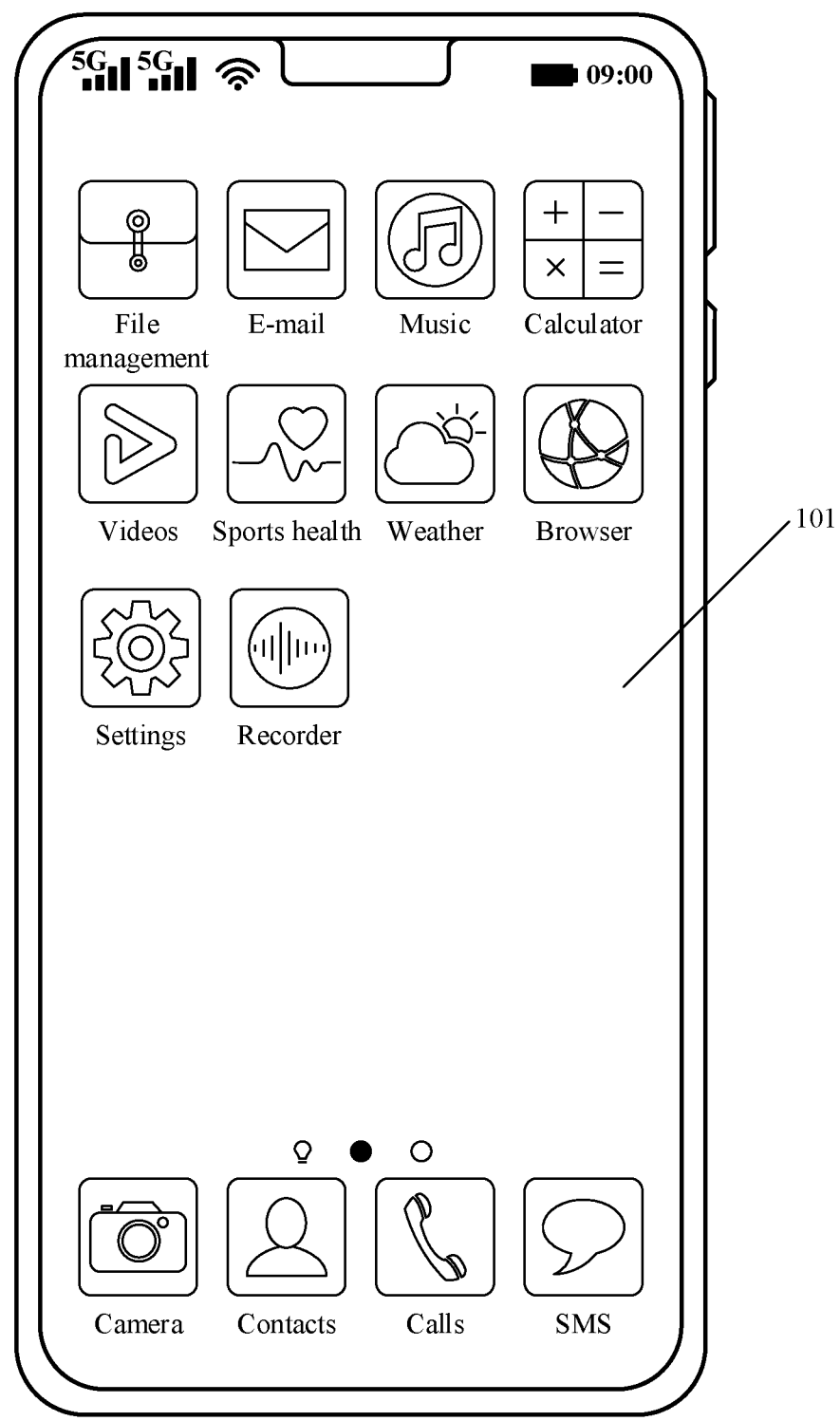
FIG. 1 is a schematic diagram of a main interface of a mobile phone according to an embodiment of this application.

The following describes implementations of the embodiments in detail with reference to the accompanying drawings. For ease of understanding, in this embodiment of this application, a mobile phone is used as an example to describe in detail technical problems existing in a control process of a conventional application:

In a conventional control mode, a mobile phone cannot intelligently identify an application that needs to be controlled for use (for example, a timeout non-office application) and an application that does not need to be controlled for use (for example, an office application and a non-timeout non-office application). Correspondingly, the mobile phone cannot differentiate between an application that needs to be controlled for use and an application that does not need to be controlled for use on a main interface. For example, referring to FIG. 1, which shows a main interface 101 of a mobile phone, and the main interface 101 includes a plurality of application icons. Applications corresponding to the plurality of application icons may include applications that need to be controlled for use and applications that do not need to be controlled for use. However, the mobile phone does not display the two applications differentially, so that a user cannot distinguish the two applications on the main interface.

In addition, in the conventional control mode, the mobile phone can control the user's use of a corresponding APP only in response to a setting operation by the user on one or more applications at an application management center or in response to a setting operation of the user at a setting center of a single APP. This control mode requires complex user operations, which increases difficulty of control operations.

An embodiment of this application provides a method for controlling an application, and the method may be applied to an electronic device in which a plurality of applications are installed. The electronic device can differentially display application icons of the applications (for example, a second application) that need to be controlled for use and the applications (for example, a first application) that do not need to be controlled for use on the main interface. In this way, the user can visually distinguish between an application that needs to be controlled for use and an application that does not need to be controlled for use on the main interface.

In addition, the electronic device may display a shortcut menu including a first control in response to a long-press operation or a double-click operation by the user on an application (for example, the second application) that needs to be controlled for use. The first control is used to trigger the electronic device to set a delay time for the application that needs to be controlled for use. The first control can easily provide the user with a function of setting a delay time for the application that needs to be controlled for use, so as to reduce difficulty in setting the delay time by the user.

Finally, when the delay time arrives, the electronic device can prompt the user of end of delayed use of the application that needs to be controlled for use, and provide the user with an intelligent timeout prompt service.

For example, the electronic device in this embodiment of this application may be a mobile phone, a tablet computer, a desktop computer, a laptop computer, a handheld computer, a notebook computer, an ultra-mobile personal computer (ultra-mobile personal computer, UMPC), a netbook, a cellular phone, a personal digital assistant (personal digital assistant, PDA), an augmented reality (augmented reality, AR)/virtual reality (virtual reality, VR) device, or the like that includes a foldable screen. A specific form of the electronic device is not specifically limited in this embodiment of this application.

The following describes implementations of the embodiments of this application with reference to accompanying drawings.

Figure 2:
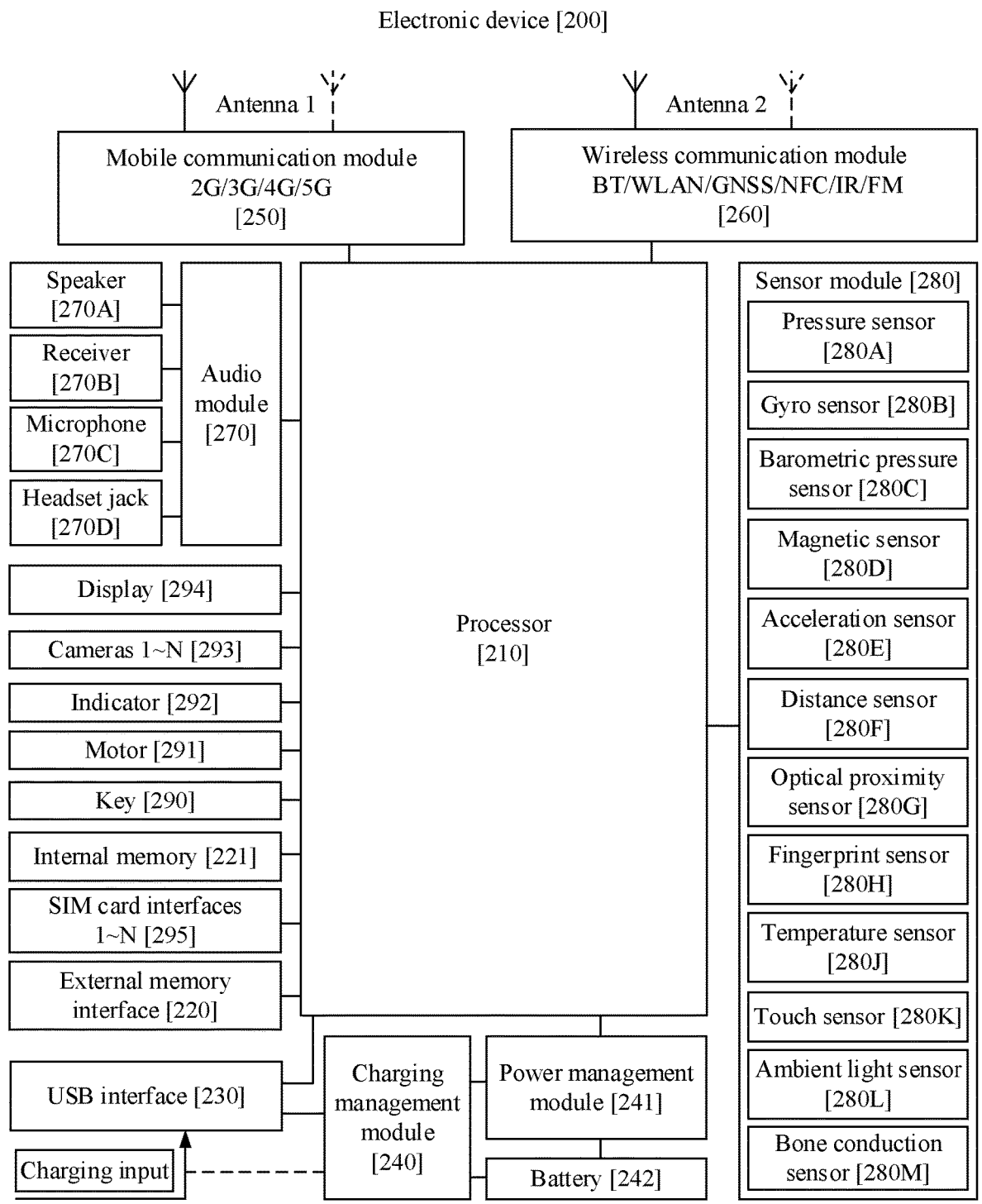
FIG. 2 is a schematic diagram of a hardware structure of a mobile phone according to an embodiment of this application.

Referring to FIG. 2, FIG. 2 is a schematic diagram of a structure of an electronic device 200 according to an embodiment of this application. As shown in FIG. 2, the electronic device may include: a processor 210, an external memory interface 220, an internal memory 221, a universal serial bus (universal serial bus, USB) interface 230, a charging management module 240, a power management module 241, a battery 242, an antenna 1, an antenna 2, a mobile communication module 250, a wireless communication module 260, an audio module 270, a speaker 270A, a receiver 270B, a microphone 270C, a headset jack 270D, a sensor module 280, a key 290, a motor 291, an indicator 292, a camera 293, a display 294, a subscriber identification module (subscriber identification module, SIM) card interface 295, and the like.

The sensor module 280 may include a pressure sensor 280A, a gyro sensor 280B, a barometric pressure sensor 280C, a magnetic sensor 280D, an acceleration sensor 280E, a distance sensor 280F, an optical proximity sensor 280G, a fingerprint sensor 280H, a temperature sensor 280J, a touch sensor 280K, an ambient light sensor 280L, a bone conduction sensor 280M, a rotating shaft sensor 280N, and the like.

It may be understood that the structure shown in this embodiment does not specifically limit the electronic device. In some other embodiments, the electronic device may include more or fewer components than those shown in the figure, combine some components, split some components, or have different component arrangements. The components in the figure may be implemented by hardware, software, or a combination of software and hardware.

The processor 210 may include one or more processing units. For example, the processor 210 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU), and the like. Different processing units may be independent devices, or may be integrated into one or more processors.

The controller may be a nerve center and a command center of the electronic device. The controller may generate an operation control signal based on instruction operation code and a timing signal, to complete control of instruction fetching and instruction execution.

It can be understood that the interface connection relationship between the modules illustrated in embodiments is merely an example for description, and does not constitute a limitation on the structure of the electronic device. In some other embodiments, the electronic device may alternatively use an interface connection manner different from those in the foregoing embodiment or a combination of a plurality of interface connection manners.

The charging management module 240 is configured to receive a charging input from a charger. The power management module 241 is configured to connect to the battery 242, the charging management module 240, and the processor 210. The power management module 241 receives an input of the battery 242 and/or the charging management module 240, and supplies power to the processor 210, the internal memory 221, an external memory, the display 294, the camera 293, the wireless communication module 260, and the like.

A wireless communication function of the electronic device may be implemented by using the antenna 1, the antenna 2, the mobile communication module 250, the wireless communication module 260, the modem processor, the baseband processor, and the like.

The antenna 1 and the antenna 2 are configured to transmit and receive electromagnetic wave signals. Each antenna in the electronic device may be configured to cover one or more communication bands. Different antennas may further be multiplexed to improve antenna utilization. For example, the antenna 1 may be multiplexed into a diversity antenna for a wireless local area network. In some other embodiments, the antenna may be used in combination with a tuning switch.

The mobile communication module 250 may provide a wireless communication solution applied to the electronic device, including 2G/3G/4G/5G. The mobile communication module 250 may include at least one filter, a switch, a power amplifier, a low noise amplifier (low noise amplifier, LNA), and the like.

The wireless communication module 260 may provide a wireless communication solution applied to the electronic device, including a wireless local area network (wireless local area networks, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), near field communication (near field communication, NFC), or infrared (infrared, IR) technology.

The electronic device implements a display function by using the GPU, the display 294, the application processor, and the like. The GPU is an image processing microprocessor and is connected to the display 294 and the application processor. The GPU is configured to perform mathematical and geometric calculations to render graphics. The processor 210 may include one or more GPUs that execute a program instruction to generate or change display information.

The display 294 is configured to display an image, a video, and the like. For example, in this embodiment of this application, the display 294 is configured to display content such as an application icon, a shortcut menu option, and a delay setting window to instruct a user to set a delay time. The display 294 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flex light-emitting diode (flex light-emitting diode, FLED), a Miniled, a MicroLed, a Micro-oLed, a quantum dot light emitting diode (quantum dot light emitting diodes, QLED), or the like.

The electronic device can implement a photographing function by using the ISP, the camera 293, the video codec, the GPU, the display 294, the application processor, and the like. The ISP is configured to process data fed back by the camera 293. For example, during photographing, a shutter is pressed, light is transmitted to a photosensitive element of the camera by using a lens, an optical signal is converted into an electrical signal, and the photosensitive element of the camera transfers the electrical signal to the ISP for processing, so that the electrical signal is converted into an image visible to a naked eye. The ISP can further optimize algorithms for noise, brightness, and a skin color of the image. The ISP can further optimize parameters such as exposure and a color temperature in a photographing scenario. In some embodiments, the ISP may be disposed in the camera 293.

The internal memory 221 may be configured to store computer executable program code, where the executable program code includes instructions. The processor 210 runs the instructions stored in the internal memory 221, to perform various function applications and data processing of the electronic device. For example, in this embodiment of this application, the processor 210 may display the shortcut menu of the second application in response to an operation by the user on the application icon by executing the instruction stored in the internal memory 221, so as to instruct the user to set a delay time, and thus control for use of the application.

The electronic device may implement an audio function, such as music playing and recording, by using the audio module 270, the speaker 270A, the receiver 270B, the microphone 270C, the headset jack 270D, the application processor, and the like.

The touch sensor 280K is also referred to as a "touch panel". The touch sensor 280K may be disposed on the display 294. The touch sensor 280K and the display 294 form a touchscreen. The touch sensor 280K is configured to detect a touch operation performed on or near the touch sensor 280K. The touch sensor can transmit a detected touch operation to the application processor to determine a type of a touch event. A visual output related to the touch operation may be provided by using the display 294. For example, in this embodiment of this application, the touch sensor 280K is configured to detect a long-press operation or double-click operation by the user on the application icon, detect a click operation by the user on a delay setting control, and detect an operation such as setting a delay time by the user. In some other embodiments, the touch sensor 280K may alternatively be disposed on a surface of the electronic device, at a position different from that of the display 294.

The key 290 includes a power key, a volume key, and the like. The motor 291 may generate a vibration prompt. The indicator 292 may be an indicator light, which may be configured to indicate a charging state and a power change, or may be configured to indicate a message, a missed call, a notification, or the like. The SIM card interface 295 is configured to connect to an SIM card. The SIM card may be inserted into the SIM card interface 295 or removed from the SIM card interface 295, so that the SIM card is in contact with or separated from the electronic device. The electronic device may support one or N SIM card interfaces, where N is a positive integer greater than 1.

The methods in the following embodiments can be all implemented in the electronic device 200 having the foregoing hardware structure, and the methods in the embodiments of this application are described below by using the electronic device 200 being a mobile phone as an example.

Figure 3:
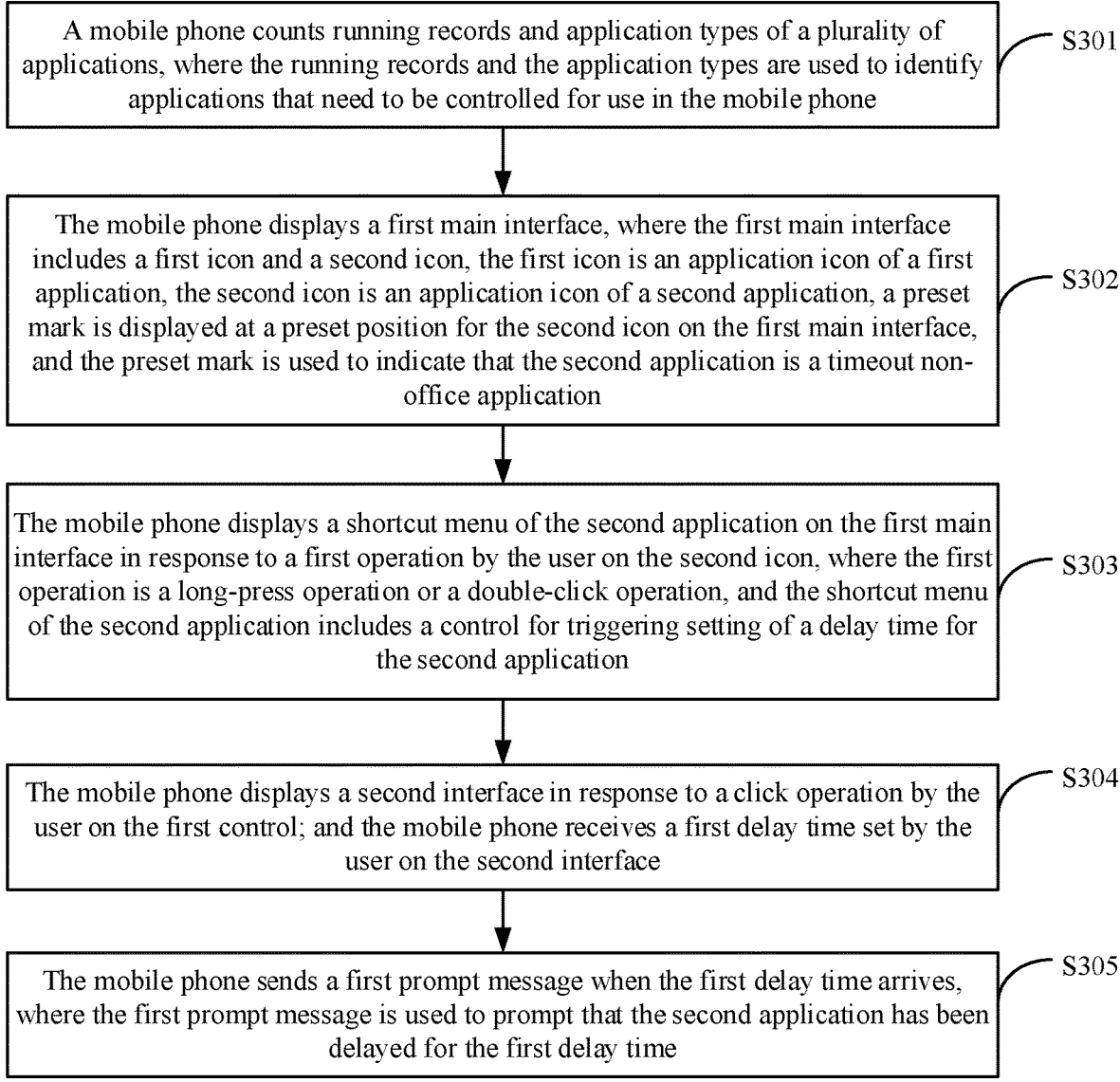
FIG. 3 is a flowchart of a method for controlling time-limited use of an application according to an embodiment of this application.

An embodiment of this application provides a method for controlling an application, and the method may be applied to a mobile phone in which a plurality of applications are installed. For example, as shown in FIG. 3, the method for controlling the application includes S301-S305.

S301: The mobile phone counts running records and application types of a plurality of applications, where the running records and the application types are used to identify applications that need to be controlled for use in the mobile phone.

The application types include office applications and non-office applications. For office applications, the mobile phone does not need to control use thereof. For example, an E-mail application is an office application, and use thereof does not need to be controlled. For non-office applications, the mobile phone has targeted control over timeout non-office applications, and does not need to control non-timeout non-office applications.

The running records include a running time and/or a quantity of running times of a corresponding application in the foreground of the mobile phone in a preset time period as of the current time. The running time is a cumulative time, and the quantity of running times is a cumulative quantity of times. In any running of an application in the foreground of the mobile phone, if a running time period of the running overlaps with a preset time period, the mobile phone counts a time in which the running time period overlaps with the preset time period into a running time, and increases the quantity of running times by one. There is overlap in the following two cases: Case 1: the running time period is included in the preset time period; and Case 2: the running time period partially overlaps with the preset time period. A running time period is a time period between start and end time points of a run.

For example, assuming that the current time is 14:30, preset time periods are 8:00-11:00 and 14:00-18:00, and running records of an application a are as follows: a first run during 8:30-8:40, a second run during 9:20-9:50, a third run during 13:30-14:10, and a fourth run during 14:15-14:20. The running time periods of the four runs overlap with the preset time periods, then it is statistically obtained that a quantity of running times of the application a in the foreground of the mobile phone in the preset time periods as of the current time is 4. Among the four runs, the running time periods of the first run, the second run, and the fourth run are included in the preset time periods, and the running time period of the third run partially overlaps with the preset time period (overlaps at 14:00-14:10). Then, a running time of the application a in the foreground in the preset time periods as of the current time is a cumulative time: 10 minutes in the first run, 30 minutes in the second run, 10 minutes overlapped with the preset time period in the third run, and 5 minutes in the fourth run, and the cumulative time is 10+30+10+5=55 minutes.

It may be understood that the preset time periods may be any time periods in which the user' use of the application of the mobile phone needs to be controlled. For example, the preset time period is a day, a week, a workday, 8:00-11:00 and 14:00-18:00 of a workday, or the like. In addition, the preset time period may be a fixed time period preset in the mobile phone, or the preset time period may be a time period in which the mobile phone receives an input from the user, or the preset time period may also be a time period analyzed and obtained by the mobile phone based on big data and/or use habits of the user, or the like. This is not specifically limited in this embodiment of this application.

So far, it should be emphasized that the "timeout" herein includes that a running time and/or a quantity of running times of a corresponding application in the foreground of the mobile phone in a preset time period as of the current time exceeds a preset threshold, and the "non-timeout" includes that the running time and/or the quantity of running times of the corresponding application in the foreground of the mobile phone in the preset time period as of the current time does not exceed the preset threshold.

The running records and the application types of the plurality of applications obtained from statistics in S301 can be used to identify applications that need to be controlled for use in the mobile phone. It should be noted that S301 is continuously performed, and there is no absolute sequence in S302-S305 below. For example, when S302-S305 are performed, real-time or periodic statistics can be performed on running records to identify a new application that needs to be controlled for use.

S302: The mobile phone displays a first main interface. The first main interface includes a first icon and a second icon, the first icon is an application icon of a first application, the second icon is an application icon of a second application, a preset mark is displayed at a preset position for the second icon on the first main interface, and the preset mark is used to indicate that the second application is a timeout non-office application.

The second application is a non-office application whose running time and/or quantity of running times in the foreground exceeds a preset threshold; and the first application is an application other than the second application among the plurality of applications.

The preset position may be any position on the second icon. For example, as shown in FIG. 4(A), a lock mark 404 is located at an edge position of an icon.

In an implementation, on the first main interface, a preset mark is displayed only at the preset position for the second icon, and no mark is displayed at a preset position for the first icon. The following description is mainly based on this manner.

Figure 4A:
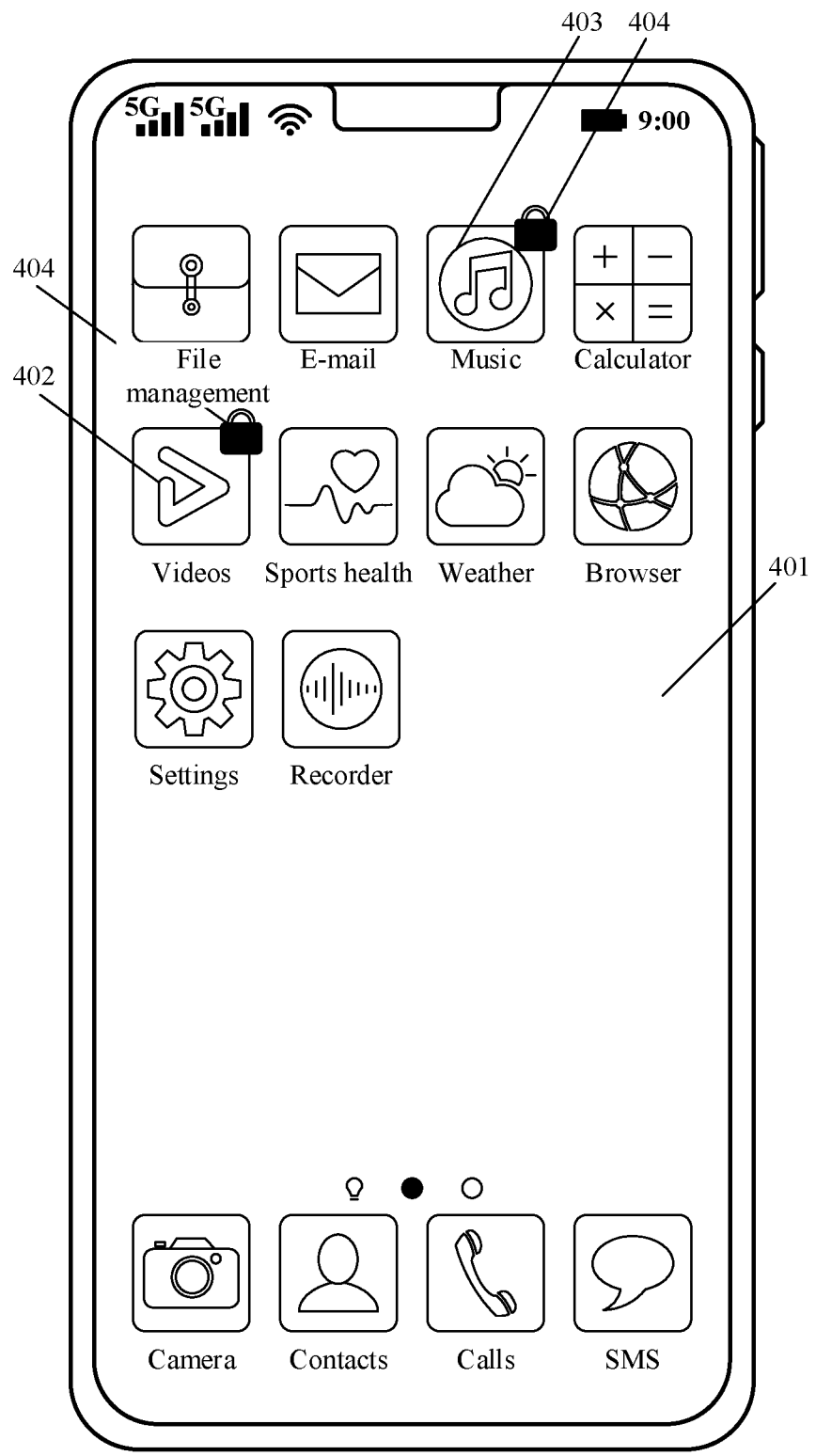
FIG. 4(A)-FIG. 4(B) are a schematic diagram of another main interface of a mobile phone according to an embodiment of this application.

For example, as shown in FIG. 4(A), on a first main interface 401 of the mobile phone, lock marks 404 are displayed in upper right corners of an application icon 402 of a video application and an application icon 403 of a music application, while the other application icons have no mark in upper right corners. The application icon 402 of the video application and the application icon 403 of the music application are the foregoing second application, and applications corresponding to application icons shown in FIG. 4(A) other than the video application and the music application are the first application. In this way, compared with the main interface 101 shown in FIG. 1, the user can clearly distinguish between the first application and the second application displayed on the first main interface 401 shown in FIG. 4(A).

Figure 4B:
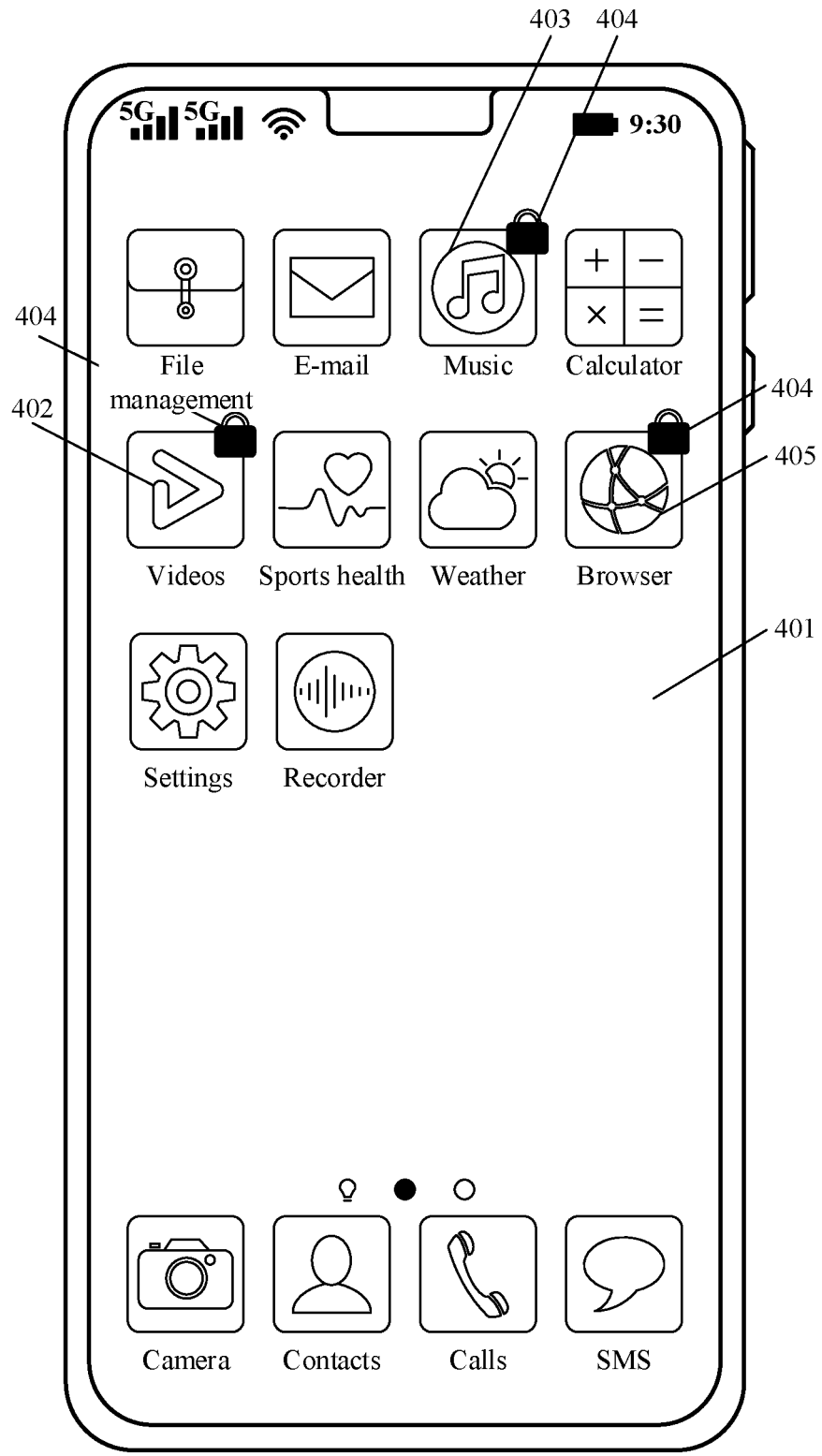

As another example, unlike FIG. 4(A), a lock mark 404 is displayed in an upper right corner of an application icon 405 of a browser application on a first main interface 401 shown in FIG. 4(B). Similarly, compared with the main interface 101 shown in FIG. 1, the user can also clearly distinguish between the first application and the second application displayed on the first main interface 401 shown in FIG. 4(B).

It should be noted that the running records and/or the application types obtained from statistics by the mobile phone in S301 are continually updated over time, and updated running records and/or application types are used to identify applications that need to be controlled for use in the mobile phone, so that new applications that need to be controlled for use can be continuously obtained. Correspondingly, an application icon with a preset mark displayed at a preset position on the main interface of the mobile phone may also change.

For example, unlike the first main interface 401 shown in FIG. 4(A), the lock mark 404 is displayed in the upper right corner of the application icon 405 of the browser application on the first main interface 401 shown in FIG. 4(B), while a lock mark 404 is not displayed in an upper right corner of an application icon of a browser application on the first main interface 401 shown in FIG. 4(A). As shown in FIG. 4(A), time displayed in a status bar of the mobile phone is 9:00; and as shown in FIG. 4(B), time displayed in a status bar of the mobile phone is 9:30. It can be learned that, during a time period of 9:00-9:30, the browser application changes from an application that does not need to be controlled for use to an application that needs to be controlled for use.

It may be understood that a specific form of the preset mark (for example, the lock mark 404) in the figure of this embodiment of this application is only an example, and may be replaced by any other mark (such as a dot and a pentagram) having an identification function in an actual implementation process.

In another implementation, the mobile phone may display different marks at preset positions for the first icon and the second icon to distinguish the first application from the second application.

S303: The mobile phone displays a shortcut menu of the second application on the first main interface in response to a first operation by the user on the second icon. The first operation is a long-press operation or a double-click operation. The shortcut menu of the second application includes a control for triggering setting of a delay time for the second application.

In a normal case, the shortcut menu displays shortcut options of native functions of a mobile phone system. For example, both a shortcut menu 501 of a video application shown in FIG. 5(A) and a shortcut menu 502 of an E-mail application shown in FIG. 5(B) include a "share" option, an "application information" option, and an "uninstall" option. Certainly, the shortcut menu may also display shortcut options for functions provided by an application or other third-party applications, and the shortcut options vary by applications. For example, the shortcut menu 501 of the video application shown in FIG. 5(A) also includes a "network-wide search" option and an "offline video" option, while the shortcut menu 502 of the E-mail application shown in FIG. 5(B) does not include the two shortcut options.

In this embodiment of this application, unlike the foregoing normal case, a first control may be added to the shortcut menu of the second application. The first control is used to trigger the mobile phone to set a delay time for the second application. The delay time is a limited time for which the second application is allowed to continue to be used. However, in the normal case, the first control does not exist in shortcut menus of all applications. That is, the shortcut menu of the second application provides an entry for setting a delay time, so that the user can easily trigger setting of the delay time.

Figure 5A:
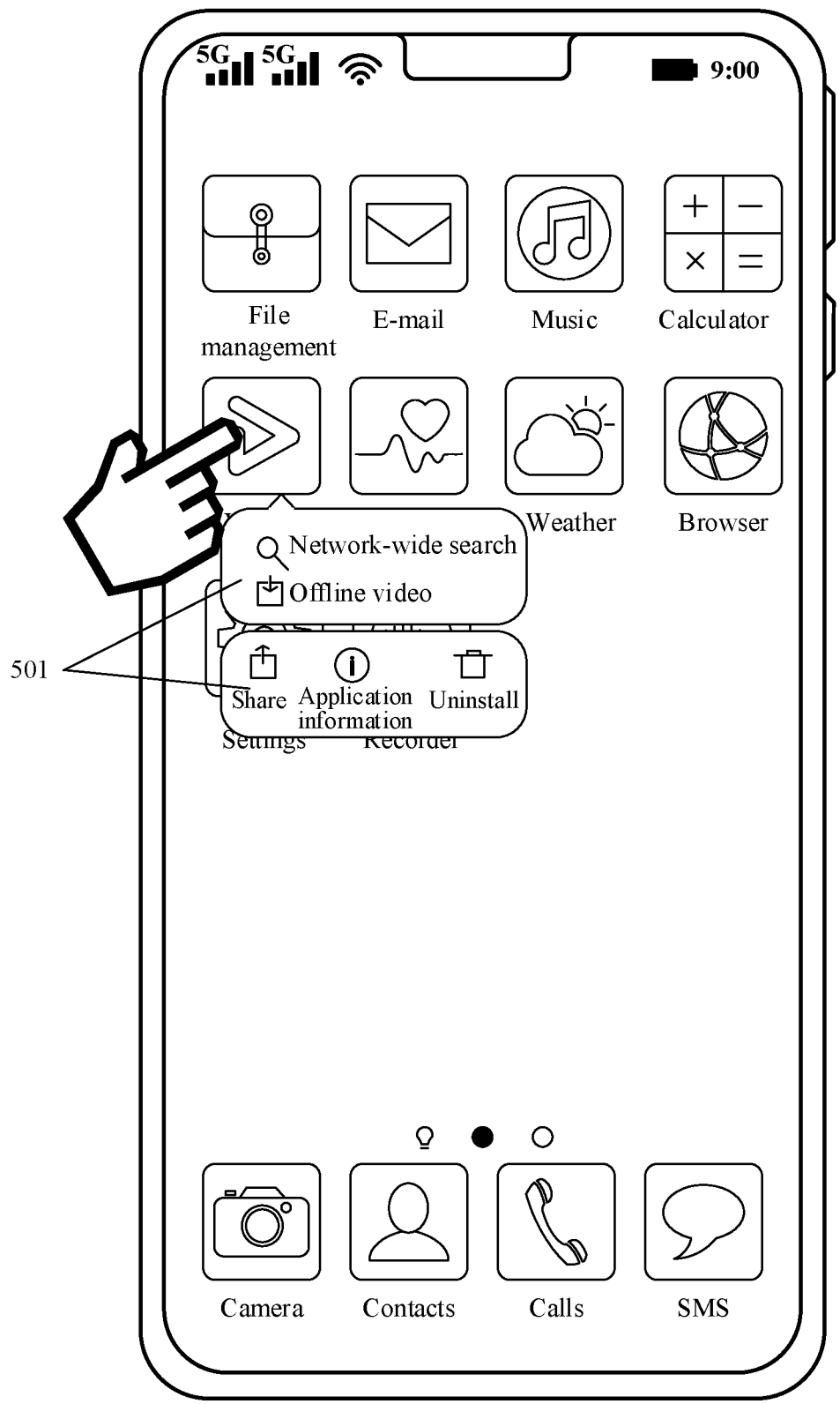
FIG. 5(A)-FIG. 5(B) are a schematic diagram of another main interface of a mobile phone according to an embodiment of this application.
Figure 5B:
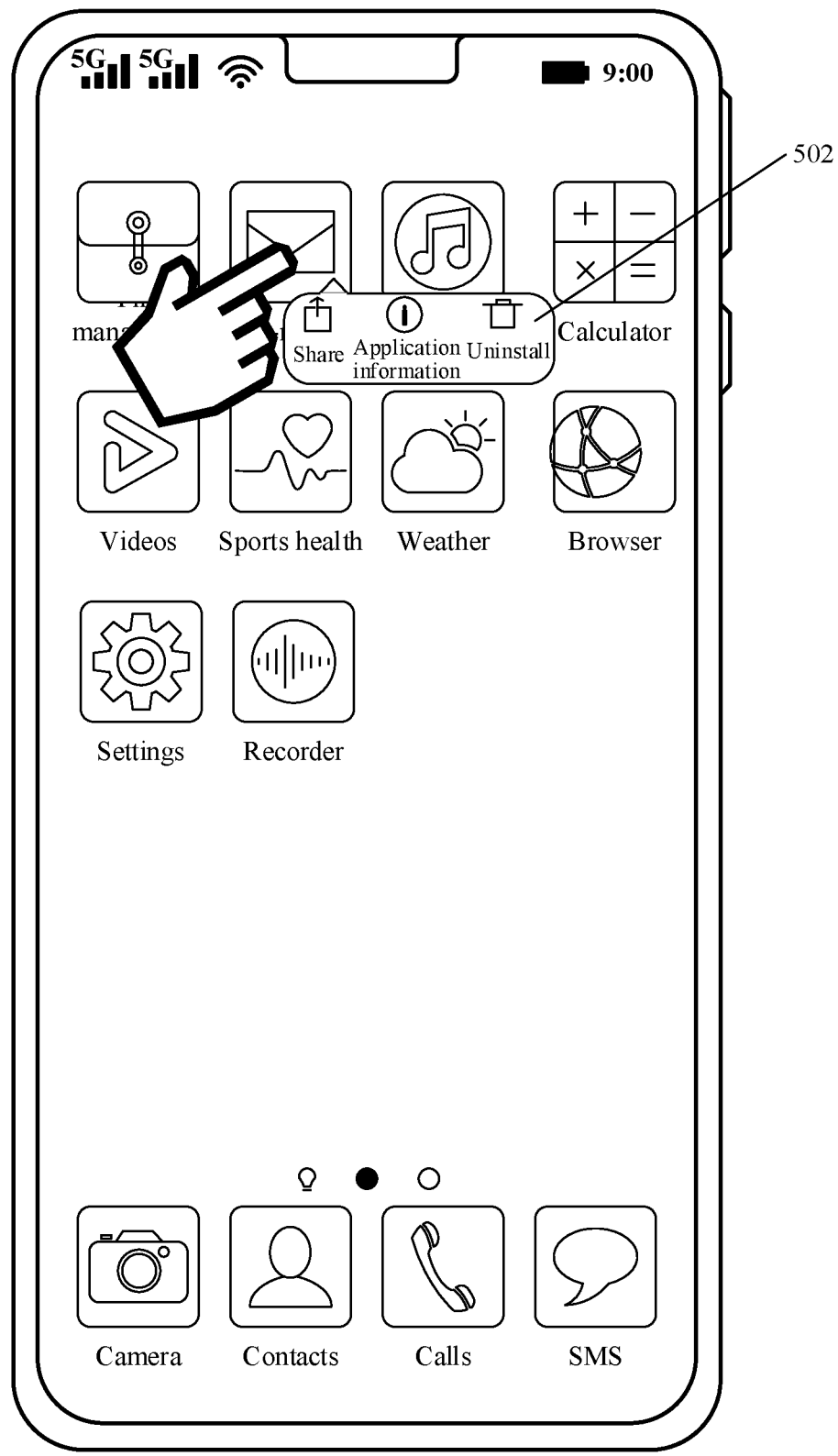
Figure 6A:
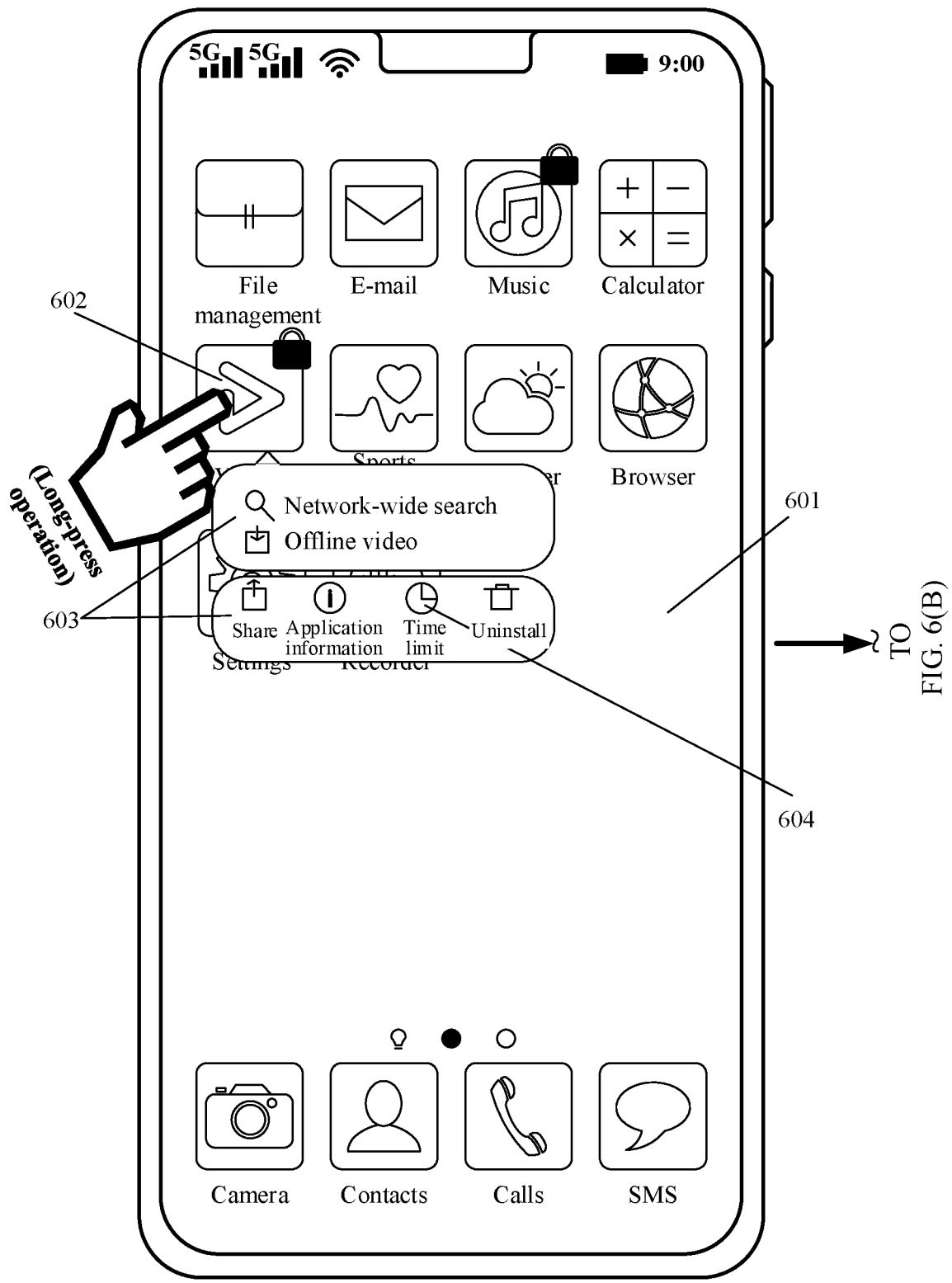
FIG. 6(A)-FIG. 6(B) are a schematic diagram of another main interface of a mobile phone according to an embodiment of this application.

For example, in response to a long-press operation by the user on an application icon 602 of a video application shown in FIG. 6(A), a shortcut menu 603 of the video application displayed by the mobile phone includes a "time limit" control 604, while the shortcut menu 501 shown in FIG. 5(A) does not include the first control.

In addition, the mobile phone displays a shortcut menu of the first application on the first main interface in response to a first operation by the user on the first icon, and the shortcut menu of the first application does not include a control for triggering the mobile phone to set a delay time for the first application. For example, in FIG. 6(A), if the mobile phone receives a long-press operation by the user on the application icon of the E-mail application, a "time limit" control is not displayed in a pop-up shortcut menu of the E-mail application. In other words, the shortcut menu of the E-mail application may be displayed without a "time limit" control, just like the shortcut menu 502 shown in FIG. 5(B).

S304: The mobile phone displays a second interface in response to a click operation by the user on the first control; and the mobile phone receives a first delay time set by the user on the second interface.

The second interface may be any interface capable of providing a delay setting function. That is, the mobile phone can directly enter a delay setting interface in response to the click operation of the user on the first control. In this way, the mobile phone can provide the user with a quick entry to enter the delay setting interface without requiring the user to access the page through tedious operations.

In addition, the delay setting function on the second interface may be provided by the second interface. For example, the second interface is a delay setting interface of the second application in a screen time management center. Alternatively, the delay setting function on the second interface is provided by a delay setting window on the second interface. The following mainly describes a process of displaying the second interface and setting a delay time in this manner.

In some embodiments, the second interface may be a main interface, and the second interface includes a delay setting window for setting a delay time. For example, the mobile phone may receive a click operation by the user on a "time limit" control 604 on a first main interface 601 shown in FIG. 6(B). The mobile phone may display a second interface 701 shown in FIG. 7 in response to the click operation by the user on the "time limit" control 604. Here, the second interface 701 is a main interface displaying a plurality of application icons, and the second interface 701 includes a delay setting window 702.

The mobile phone can receive a first delay time set by the user in the delay setting window. After the mobile phone completes setting of the first delay time, the application interface of the second application can be directly displayed for use by the user. In this way, the mobile phone can quickly enter the second application. Alternatively, after the mobile phone completes the setting of the first delay time, the delay setting window is closed, and the application interface of the second application is displayed only after the mobile phone receives a request from the user for use of the second application (for example, a use request triggered by an operation of clicking the second icon, or a use request triggered by an operation of waking up the second application in the background), so that use requirements of the user can be accurately met.

Alternatively, the mobile phone may receive an operation of canceling time setting by the user in the delay setting window, and the mobile phone closes the delay setting window on the main interface in response to the operation of canceling time setting by the user in the delay setting window.

Figure 7:
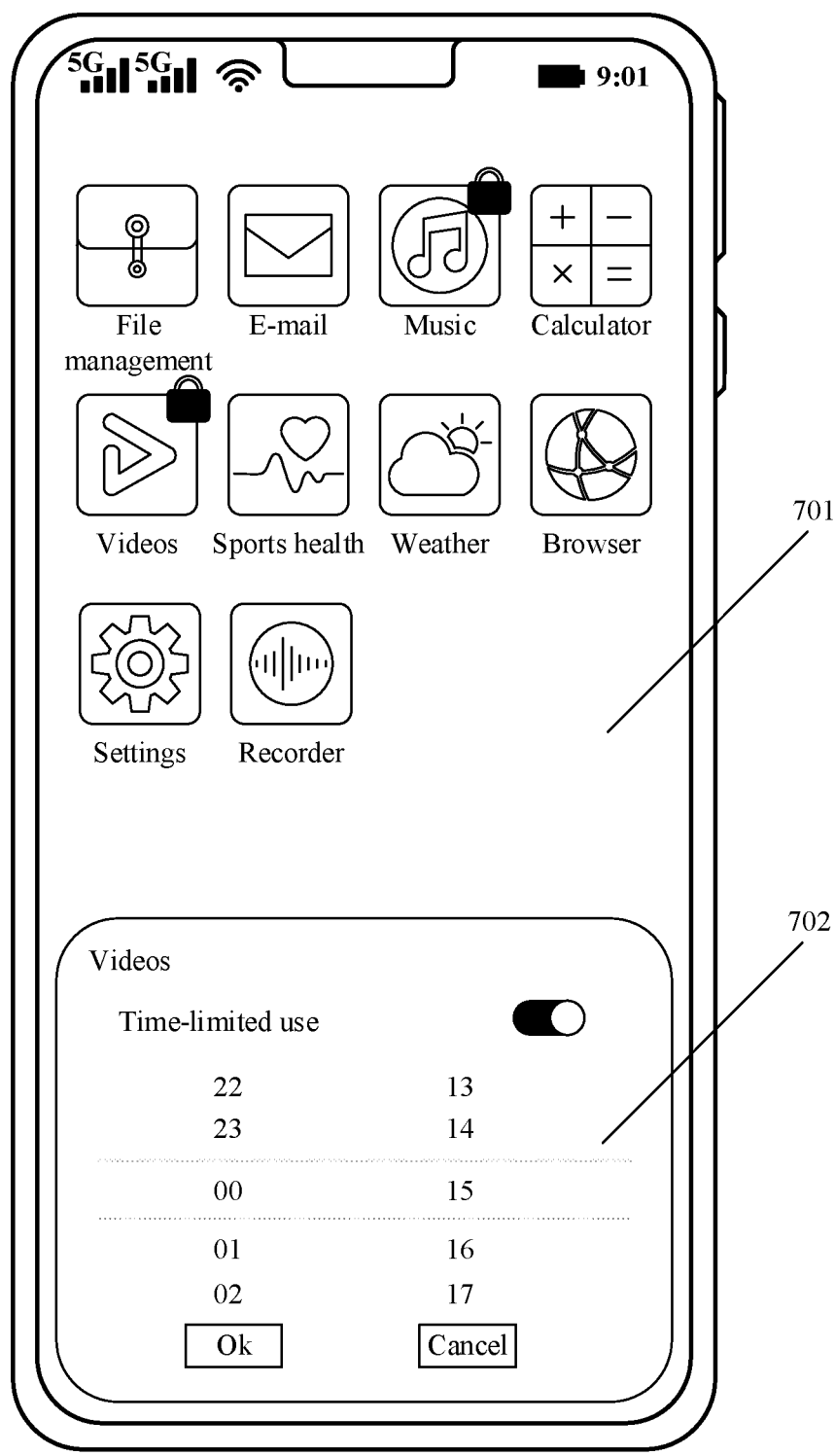
FIG. 7 is a schematic diagram of a delay time setting interface according to an embodiment of this application.

For example, as shown in FIG. 7, the mobile phone may receive the user's operation of selecting a 15-minute delay time in the delay setting window 702 on the second interface 701, and clicking OK to complete setting of a 15-minute first delay time. The mobile phone may receive a click operation by the user on a "cancel" button in the delay setting window 702, and the mobile phone closes the delay setting window 702 in response to the click operation by the user on the "cancel" button in the delay setting window 702.

In some other embodiments, the second interface may be an application interface of the second application, and the second interface includes a delay setting window for setting a delay time. For example, the mobile phone may receive a click operation by the user on a "time limit" control 604 on a first main interface 601 shown in FIG. 6(B). The mobile phone may display a second interface 801 shown in FIG. 8 in response to the click operation by the user on the "time limit" control 604. Here, the second interface 801 is an application interface of a video application, and a delay setting window 802 is displayed on the second interface 801.

The mobile phone can receive a first delay time set by the user in the delay setting window. After the mobile phone completes setting of the first delay time, the mobile phone closes the delay setting window, so that the application interface can be completely displayed for use by the user.

Alternatively, the mobile phone may receive an operation of canceling time setting by the user in the delay setting window. In response to the operation of canceling time setting by the user in the delay setting window, the mobile phone closes the delay setting window on the application interface, exits a time-limited use mode, or exits the application interface directly. The mobile phone enters a time-limited use mode of the second application after receiving the click operation by the user on the first control. After the mobile phone exits the time-limited use mode, the mobile phone may run the second application for a long time in the foreground without time limit.

Figure 8:
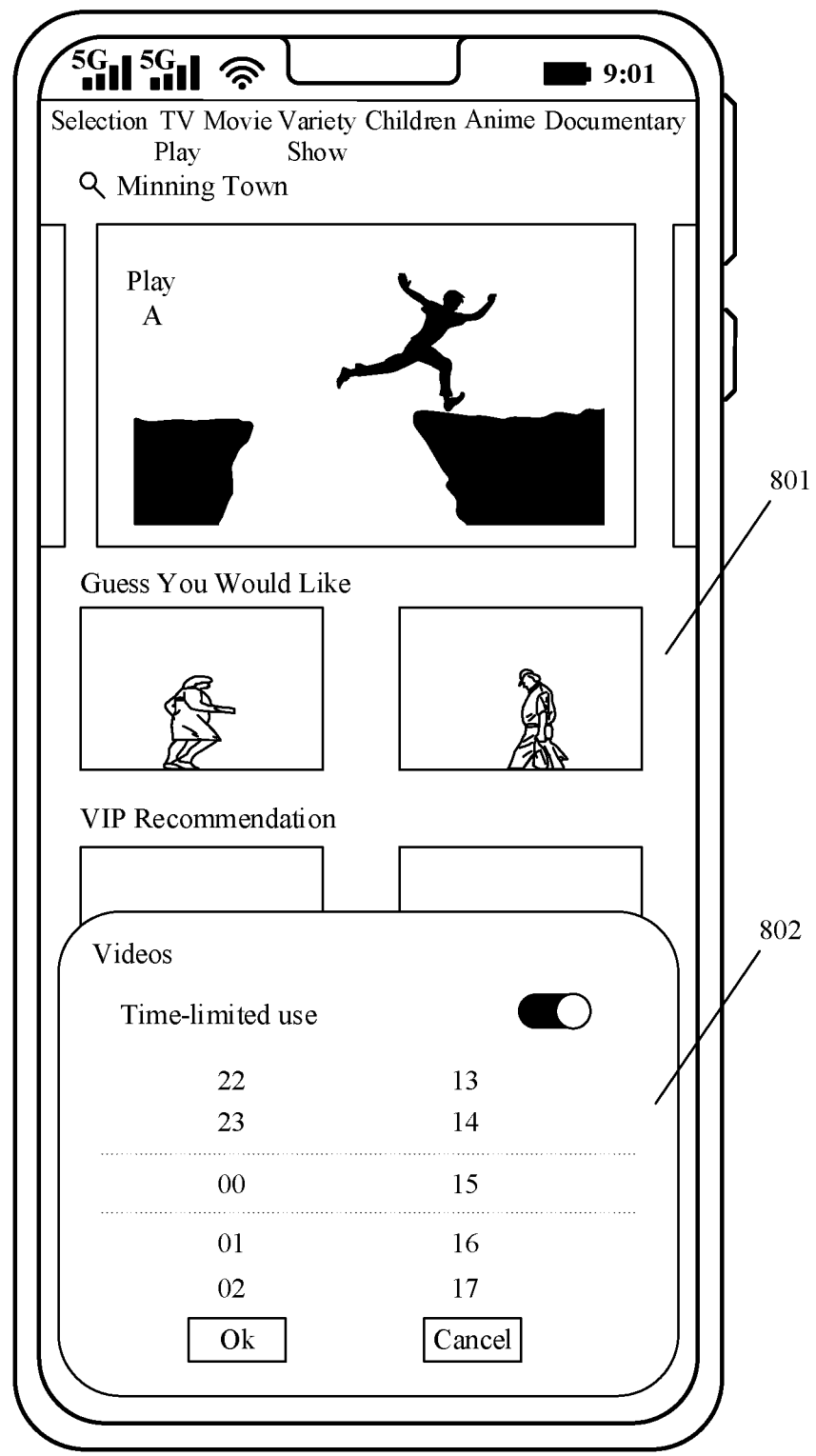
FIG. 8 is a schematic diagram of another delay time setting interface according to an embodiment of this application.

For example, the mobile phone may receive the user's operation of selecting a 15-minute delay time in the delay setting window 802 on the second interface 801 shown in FIG. 8, and clicking OK to complete setting of a 15-minute first delay time. The mobile phone may receive a click operation by the user on a "cancel" button in the delay setting window 802 on the second interface 801 shown in FIG. 8. In response to the click operation by the user on the "cancel" button in the delay setting window 802, the mobile phone closes the delay setting window 802 and exits the time-limited use mode.

It may be understood that a time setting form provided in the second interface shown in FIG. 7 and FIG. 8 is only an example. In practice, the mobile phone may also provide a setting form in which the user inputs a time number, or provide a form in which a time is adjusted by using "+" and "−" controls, or the like. This is not specifically limited in this embodiment of this application.

It should be noted that the first delay time may be an upper limit of a running time of a single run in the foreground. In this way, the mobile phone can accurately limit a time for using the second application each time by the user. Alternatively, the first delay time may be an upper limit of a cumulative running time in the foreground. In this way, the mobile phone can control a time for using the second application by the user as a whole. This is not specifically limited in this embodiment of this application. In this embodiment of this application, the former is mainly described. Specifically, the first delay time is the upper limit of the running time of the second application running in the foreground each time within remaining time of the preset time period.

S305: The mobile phone sends a first prompt message when the first delay time arrives. The first prompt message is used to prompt that the second application has been delayed for the first delay time.

If the first delay time is the upper limit of the running time of the second application running in the foreground each time within remaining time of the preset time period, that the first delay time arrives means that the running time of the second application in a single run in the foreground within the remaining time of the preset time period reaches the first delay time.

For example, if a video application is directly used after the first delay time is set to 15 minutes at 9:01:00, then the first delay time arrives when the video application is used at 9:14:59. Alternatively, when the video application is exited at 9:12:00, the first delay time does not arrive this time, and thereafter, when the video application is entered again at 9:13:00, the first delay time arrives when the video application is used at 9:27:59.

Figure 9:
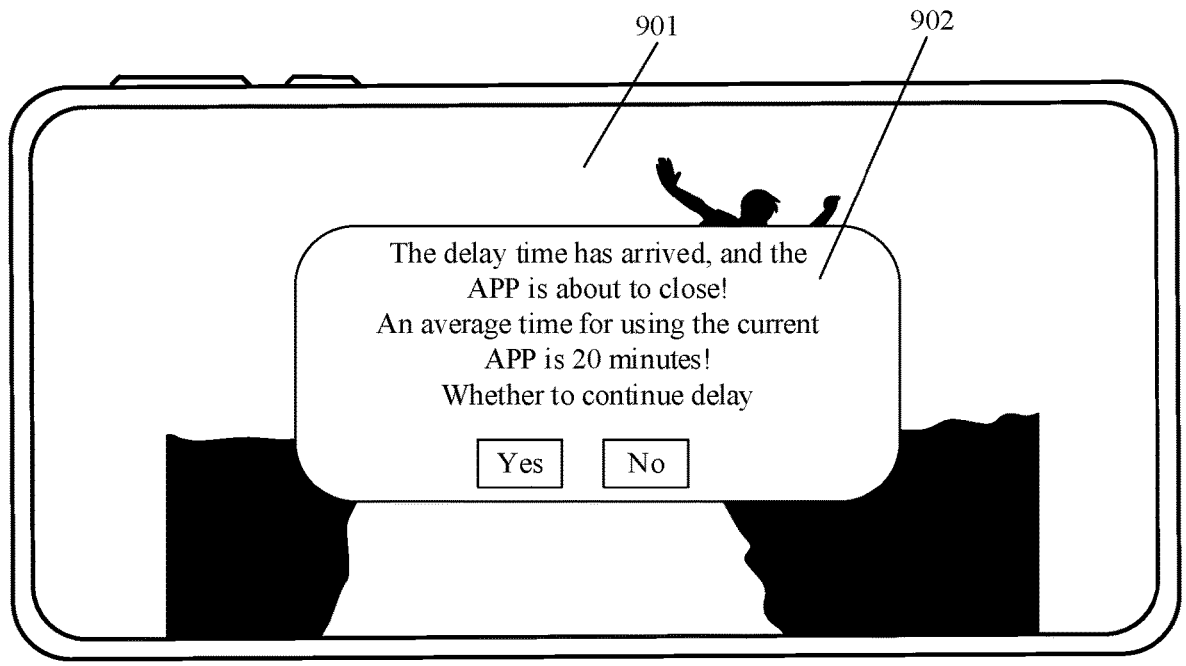
FIG. 9 is a schematic diagram of a prompt interface for delay time arrival according to an embodiment of this application.

In some embodiments, the first prompt message is displayed on an application interface used at the current time. For example, as shown in FIG. 9, when the first delay time arrives, the mobile phone displays an application interface 901 (for example, an interface for playing a video) used at the current time, and displays a first prompt message 902 on the application interface 901. In this mode, only the first prompt message is further displayed on the application interface displayed at the current time, and content on the interface changes slightly. In this way, continuity of information display can be improved.

Figure 10:
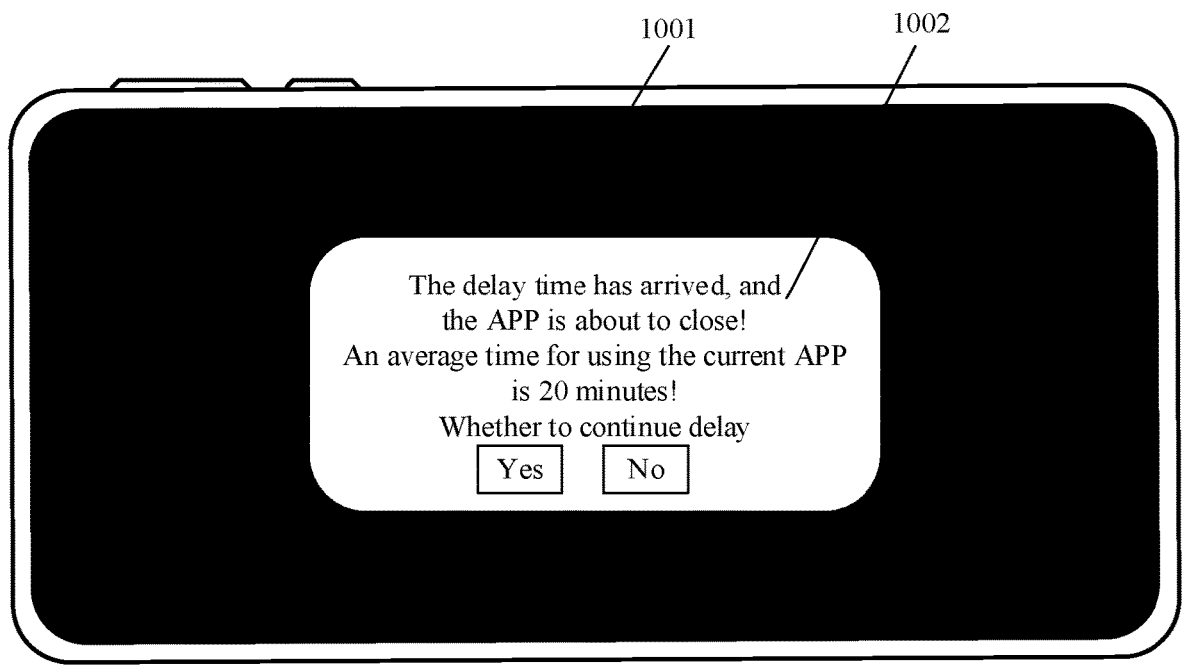
FIG. 10 is a schematic diagram of another prompt interface for delay time arrival according to an embodiment of this application.

In some other embodiments, the first prompt is displayed on a black screen interface of the mobile phone. For example, as shown in FIG. 10, when the first delay time arrives, the mobile phone displays a black screen interface 1001, and further displays a first prompt message 1002 on the black screen interface 1001. The black screen interface of the mobile phone has a strong visual impact. In this way, an effect of the prompt can be enhanced.

In some embodiments, to instruct the user to cooperatively complete an operation of controlling use, the first prompt message includes not only a prompt or sign indicating an end of a delay, but also historical running records, a delay prompt message, and/or a selection control, where the historical running records include, but are not limited to, a quantity of historical running times, a historical average running time, and/or a historical cumulative running time. For example, as shown in FIG. 9 and FIG. 10, the text "An average time for using the current APP is 20 minutes" in the first prompt message is a historical average running time, and "Whether to continue delay" is a delay prompt message. The selection control includes a first selection control and a second selection control. The first selection control is used to trigger continuation of delayed use of the second application. For example, the first selection control may be a "Yes" button shown in FIG. 9 and FIG. 10. The second selection control is used to trigger termination of use of the second application. For example, the second selection control may be a "No" button shown in FIG. 9 and FIG. 10. According to this embodiment, the mobile phone can further instruct the user to cooperatively complete operations such as continuing delay and exiting from use on the basis of prompting an end of a delay, so as to better control use of the second application.

The mobile phone can receive an operation by the user on the first selection control in the first prompt message. In response to the operation by the user on the first selection control in the first prompt message, the mobile phone may extend a service time of the second application again, and close the second application after the extended service time arrives. For example, if the mobile phone receives a click operation by the user on the "Yes" button shown in FIG. 10, a video application will be delayed for 1 minute, and the video application will be closed after 1 minute. Alternatively, the mobile phone displays a delay setting window in response to the operation by the user on the first selection control in the first prompt message, and the delay setting window is used to provide the user with a delay setting function. In addition, after the delay time arrives again, the mobile phone will display the first prompt message again, and so on. In this implementation, the mobile phone can provide the user with an operation entry for continuing a delay after the first delay time arrives, so as to meet the user's requirement of continuing to use the second application.

For the delay setting window, refer to FIG. 7 and FIG. 8, and related text descriptions. Details are not described herein again. The only difference is that the delay setting window is displayed on the application interface used at the current time, that is, displayed at a position similar to that of the first prompt message, rather than being displayed on the first main interface or the application interface after the application is entered.

Alternatively, the mobile phone can receive an operation by the user on the second selection control in the first prompt message. The mobile phone closes the second application in response to the operation by the user on the second selection control in the first prompt message. For example, the mobile phone may receive a click operation by the user on the "No" button on the black screen interface 1001 shown in FIG. 10. The mobile phone exits running of the video application in the foreground in response to the click operation by the user on the "No" button on the black screen interface 1001. In this way, the mobile phone can exit the application in response to the operation by the user after the first delay time arrives, so as to achieve an effect of controlling use.

In conclusion, by using the method according to this embodiment of this application, the mobile phone counts running records and application types of a plurality of applications to identify a second application that needs to be controlled for use in the mobile phone, so that the second application can be intelligently identified; and an application icon of the second application is differentially identified on the main interface of the mobile phone, so that the user can visually distinguish applications that need to be controlled for use from applications that do not need to be controlled for use on the main interface. In addition, in response to an operation by the user on the application icon of the second application, the mobile phone may display a second interface that is provided with a limited time setting entry for the user to set a first delay time, without a complex operation by the user to trigger time setting, which improves convenience of delay setting. In addition, a timeout prompt service can be provided after the first delay time arrives.

Figure 11:
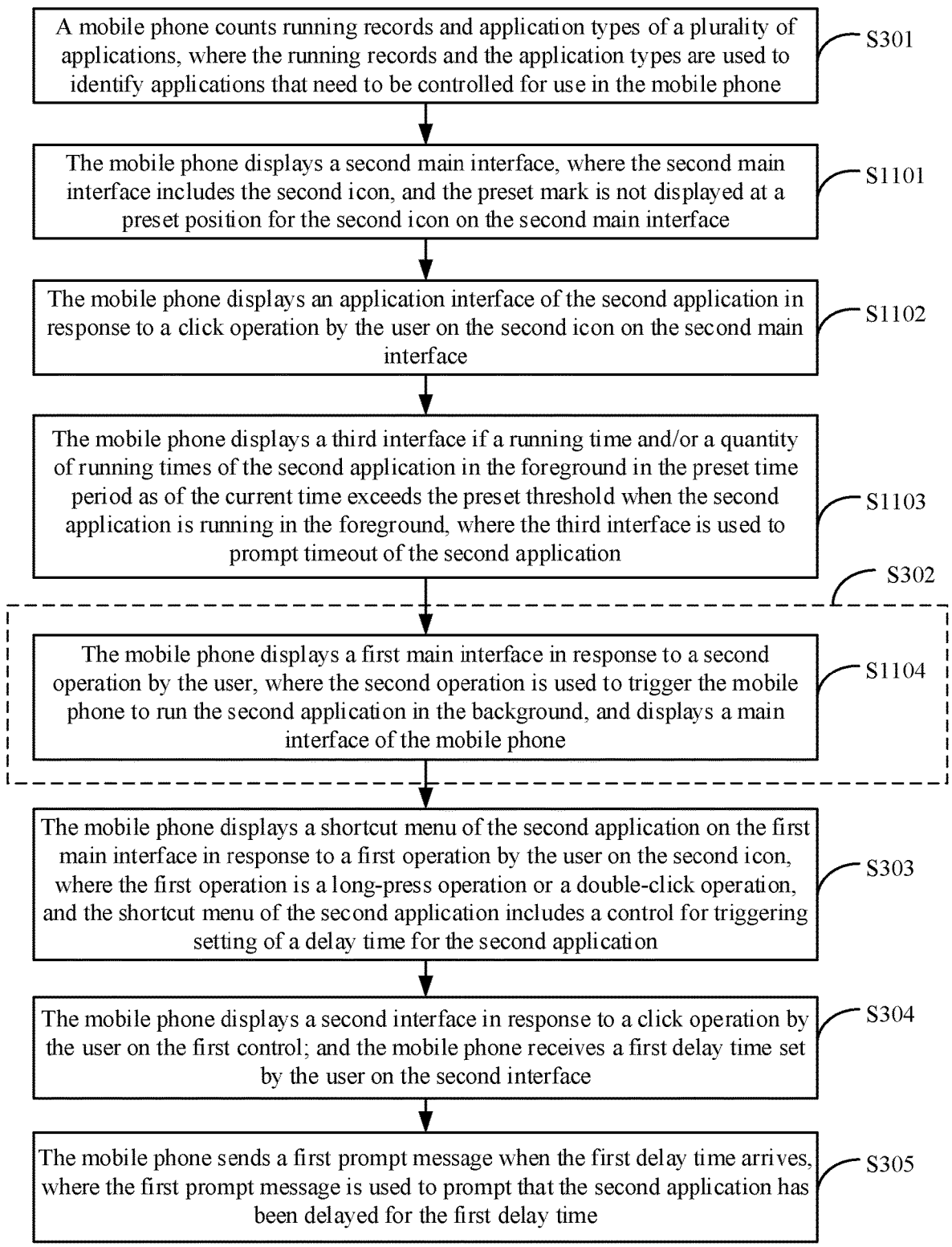
FIG. 11 is a flowchart of another method for controlling time-limited use of an application according to an embodiment of this application.

It may be understood that the running records obtained from statistics by the mobile phone may vary. For example, when the mobile phone performs S302 to display the first main interface, the second application has timed out, and therefore is an application that needs to be controlled for use. However, for a time period before the mobile phone performs S302, the second application may not have timed out, and therefore is an application that does not need to be controlled for use. After this time period, the mobile phone runs the second application in the foreground in response to an operation by the user, causing the second application to time out, and then the mobile phone displays the second icon including a preset mark on the first main interface. Specifically, as shown in FIG. 11, before S302 shown in FIG. 3, the method according to this embodiment of this application further includes S1101-S1103, and S302 in FIG. 3 further includes S1104.

S1101: The mobile phone displays a second main interface, where the second main interface includes the second icon, and the preset mark is not displayed at a preset position for the second icon on the second main interface.

The second main interface and the first main interface are relative, and there is no absolute first main interface and second main interface. For any application, the first interface is a main interface of the mobile phone after the application is identified as an application that needs to be controlled for use. On the first main interface, a preset mark is displayed at a preset position for an application icon (that is, the second icon) of the application. The second interface is a main interface of the mobile phone before the application is identified as an application that needs to be controlled for use. On the second main interface, a preset mark is not displayed at a preset position for an application icon of the application.

For example, for a browser application, the main interface of the mobile phone shown in FIG. 4(A) is the second main interface, and the main interface of the mobile phone shown in FIG. 4(B) is the first main interface. For a video application and a music application, the main interface of the mobile phone shown in FIG. 4(A) and the main interface of the mobile phone shown in FIG. 4(B) are first main interfaces.

S1102: The mobile phone displays an application interface of the second application in response to a click operation by the user on the second icon on the second main interface.

The second icon is an application icon of the second application. The click operation by the user on the second icon on the second main interface is used to trigger the mobile phone to run the second application in the foreground. Therefore, the mobile phone may display the application interface of the second application in response to the click operation by the user on the second icon.

S1103: The mobile phone displays a third interface if a running time and/or a quantity of running times of the second application in the foreground in the preset time period as of the current time exceeds the preset threshold when the second application is running in the foreground, where the third interface is used to prompt timeout of the second application.

The third interface may be an application interface currently being used by the second application, or a black screen interface of the mobile phone, for example, an all-black or all-white application interface. On the third interface, the mobile phone displays a third prompt message. The third prompt message is used to prompt timeout of the second application.

Figure 12:
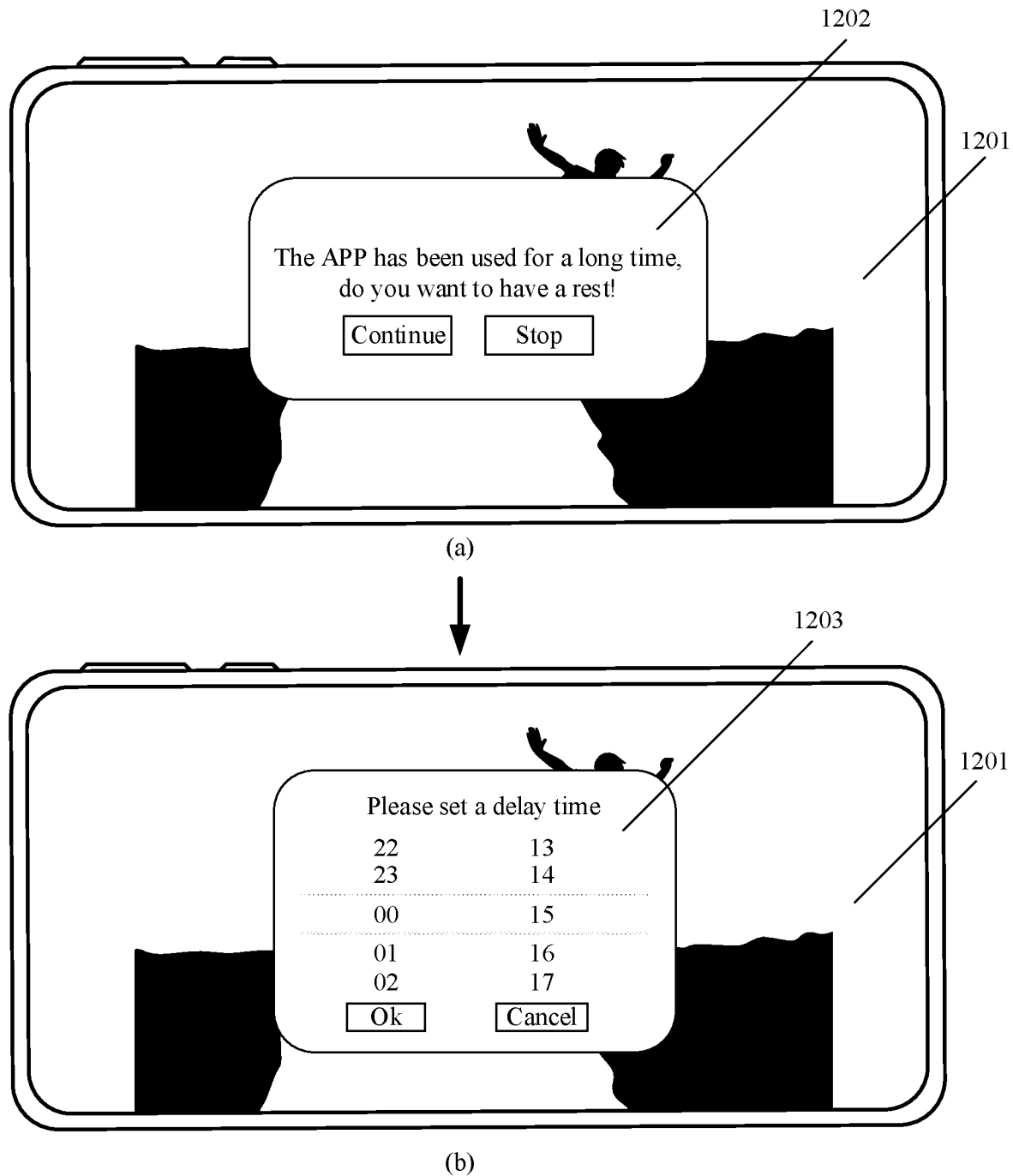
FIG. 12 is a schematic diagram of a display interface of a mobile phone according to an embodiment of this application.

For example, when a video application is identified to be an application that needs to be controlled for use (that is, a running time and/or a quantity of running times of the video application in the foreground in the preset time period as of the current time exceeds the preset threshold), as shown in the figure, the video application is playing a video shown in (a) in FIG. 12 in a landscape mode in the foreground of the mobile phone, that is, the video application is running in the foreground. In this case, a process shown in FIG. 3 cannot be used to control use of the video application. In this case, the mobile phone performs S1103, and displays a third prompt message 1202 on a video playback interface 1201 currently being used by the video application to prompt the user of timeout in a timely manner. The video application is a second application. In this way, when an application is running in the foreground, the mobile phone can prompt the user of timeout in a timely manner after the application is identified as an application that needs to be controlled for use.

In the foregoing S1103, the mobile phone needs to identify whether the second application is an application that needs to be controlled for use, that is, to identify whether a running time and/or a quantity of running times of the second application in the foreground in the preset time period as of the current time exceeds the preset threshold.

In some embodiments, to reduce an amount of data computation during identification, an application type may be identified first, and then it is detected whether a running time and/or a quantity of running times of a corresponding application in the foreground in the preset time period as of the current time exceeds the preset threshold. Specifically, the mobile phone identifies an application type of each of the plurality of applications, where the application types include office applications and non-office applications; and counts a running time and/or a quantity of running times of each non-office application among the plurality of applications installed on the mobile phone in the foreground in the preset time period. If a running time and/or a quantity of running times of a first non-office application among the plurality of applications in the foreground in the preset time period as of the current time exceeds the preset threshold, the first non-office application is determined to be the second application, where the first non-office application is any one of non-office applications among the plurality of applications.

In the foregoing process of detecting whether the running time and/or the quantity of running times of the corresponding application in the foreground in the preset time period as of the current time exceeds the preset threshold, only the running time and/or the quantity of running times may be detected. When the corresponding preset threshold is exceeded, the second application can be determined. It is also possible to detect both the running time and the quantity of running times, and the second application can be determined only when both the running time and the quantity of running times exceed corresponding preset thresholds. That is, that the running time and/or the quantity of running times exceeds the preset threshold includes: the running time exceeds a preset threshold; and/or the quantity of running times exceeds a preset threshold.

However, in practice, compared with use of the same application for a long time, frequent use of the same application will divide a whole period of time of the user into more fragments, which will greatly affect learning and work of the user.

Figure 13:
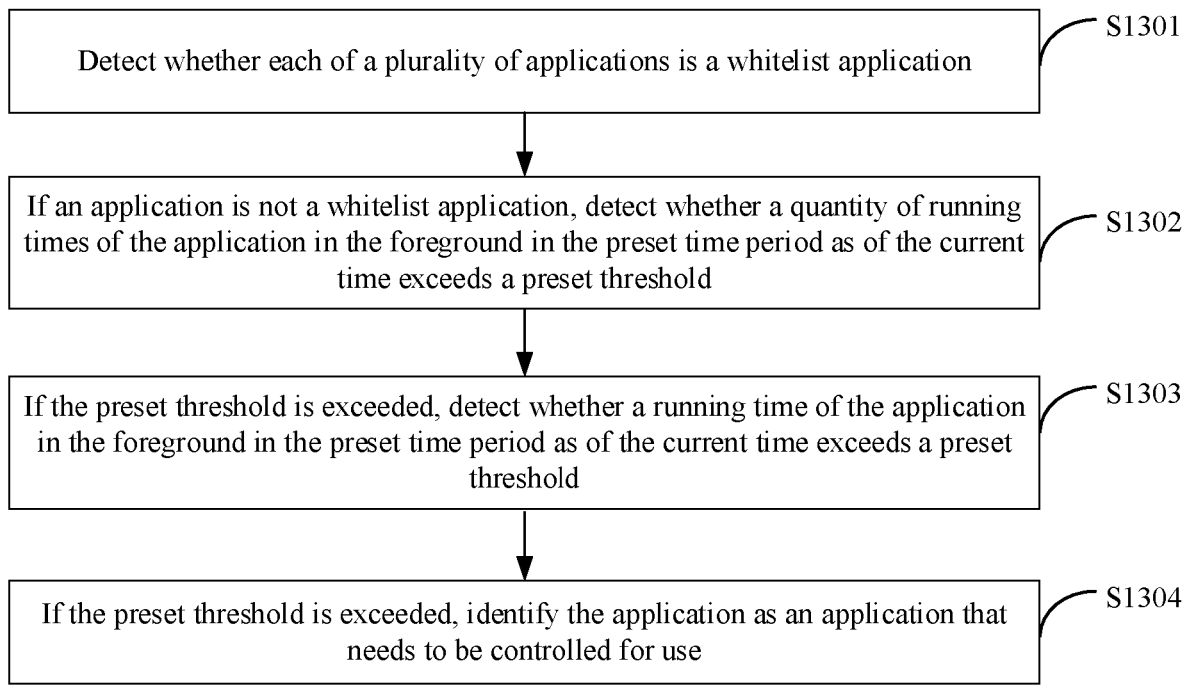
FIG. 13 is a flowchart of a method for identifying an application to be controlled for use according to an embodiment of this application.

Based on this, in some specific implementations, for any application, the mobile phone first identifies the application type, and then detects the application with reference to the quantity of running times and the running time, and finally determines a non-office application that is frequently used and is used for a long time as an application that needs to be controlled for use. Referring to FIG. 13, FIG. 13 illustrates an example of a process of identifying an application that needs to be controlled for use in this specific implementation. The application that needs to be controlled for use is identified based on the running records and the application types. As shown in FIG. 13, the identification process in S1103 includes S1301-S1304.

S1301: Detect whether each of the plurality of applications is a whitelist application.

A whitelist includes application identifiers of one or more office applications. If an application is not an office application, the application is not a whitelist application.

If the application is not a whitelist application, S1302 is performed; and if the application is a whitelist application, there is no need to limit use thereof, and identification for the current application ends.

S1302: If the application is not a whitelist application, detect whether a quantity of running times of the application in the foreground in the preset time period as of the current time exceeds a preset threshold.

If the preset threshold is exceeded, perform S1303; or if the preset threshold is not exceeded, repeat S1302 until the preset threshold is exceeded, or until the preset time period expires. If the preset threshold has not been exceeded at the end of the preset time period, identification for the current application ends.

S1303: If the preset threshold is exceeded, detect whether a running time of the application in the foreground in the preset time period as of the current time exceeds a preset threshold.

If the preset threshold is exceeded, perform S1304; or if the preset threshold is not exceeded, repeat S1303 until the preset threshold is exceeded, or until the preset time period expires. If the preset threshold has not been exceeded at the end of the preset time period, identification for the current application ends.

S1304: If the preset threshold is exceeded, identify the application as an application that needs to be controlled for use.

According to this embodiment, applications that need to be controlled for use are identified with reference to the running time and the quantity of running times, and scattered applications that occupy user time for a long time are identified as applications that need to be controlled for use. In this way, the mobile phone can subsequently control use of such applications, so as to further make restrictions more targeted.

Generally, applications are developed very fast, and new applications appear at any time. For these new applications that appear in a short time, there is often no record of application types in the local mobile phone, which will affect an accuracy of identifying a second application by the mobile phone.

In this case, in some embodiments, the mobile phone obtains an application type of each of the plurality of applications from a cloud server, and then identifies the second application based on running records and the application type obtained from the cloud server, where the cloud server is a background server of an application market. Alternatively, considering that for application types of only a few applications among the plurality of applications installed in the mobile phone, there is no record in a local application market of the mobile phone, based on this, in an implementation, an electronic device obtains application types of the plurality of applications from the local mobile phone, and for a fourth application whose application type cannot be obtained, further obtains an application type of the fourth application from the cloud server, where the fourth application is any one of the plurality of applications.

According to this embodiment, the mobile phone improves the application types by using the cloud server, so as to improve accuracy of identification results.

S1104: The mobile phone displays a first main interface in response to a second operation by the user, where the second operation is used to trigger the mobile phone to run the second application in the background, and displays a main interface of the mobile phone.

For example, the mobile phone may receive a click operation by the user on a "Stop" button in the third prompt message 1202 on the application interface 1201 shown in (a) in FIG. 12. The mobile phone closes running of the video application in the foreground in response to the click operation by the user on the "Stop" button in the third prompt message 1202. In this case, the mobile phone displays the first main interface.

After the first main interface is displayed, S303-S305 can be performed to limit use of the second application.

According to this embodiment, for an application identified as an application that needs to be controlled for use during running in the foreground, after the mobile phone identifies the application as an application that needs to be controlled for use, the application interface prompts the user of timeout, so as to improve timeliness of control for use.

Further, for an application identified as an application that needs to be controlled for use during running in the foreground, the third interface in S1103 includes a delay setting window for setting a delay time to implement timing control on the application during running. The mobile phone receives a second delay time set by the user in the delay setting window on the third interface; and when the second delay time arrives, the mobile phone sends a second prompt message, where the second prompt message is used to prompt that the second application has been delayed for the second delay time.

For example, the mobile phone receives a click operation by the user on a "Continue" button in the third prompt message 1202 on the application interface 1201 shown in (a) in FIG. 12. In response to the click operation by the user on the "Continue" button in the third prompt message 1202, the mobile phone may display a delay setting window 1203 shown in (b) in FIG. 12 for the user to set a second delay time to continue using. The mobile phone completes setting of the second delay time after receiving a click operation by the user on an "OK" control in the delay setting window 1203. Thereafter, the mobile phone sends a second prompt message when the second delay time arrives. For a specific display of the second prompt message, refer to FIG. 9 and FIG. 10, and description about sending of the first prompt message when the first delay time arrives in a related text part. Details are not described herein again.

According to this embodiment, for an application identified as an application that needs to be controlled for use during running in the foreground, timeout of the application can be prompted in a timely manner, and delay settings by the user can be received, so as to implement timing control in this case.

Figure 14:
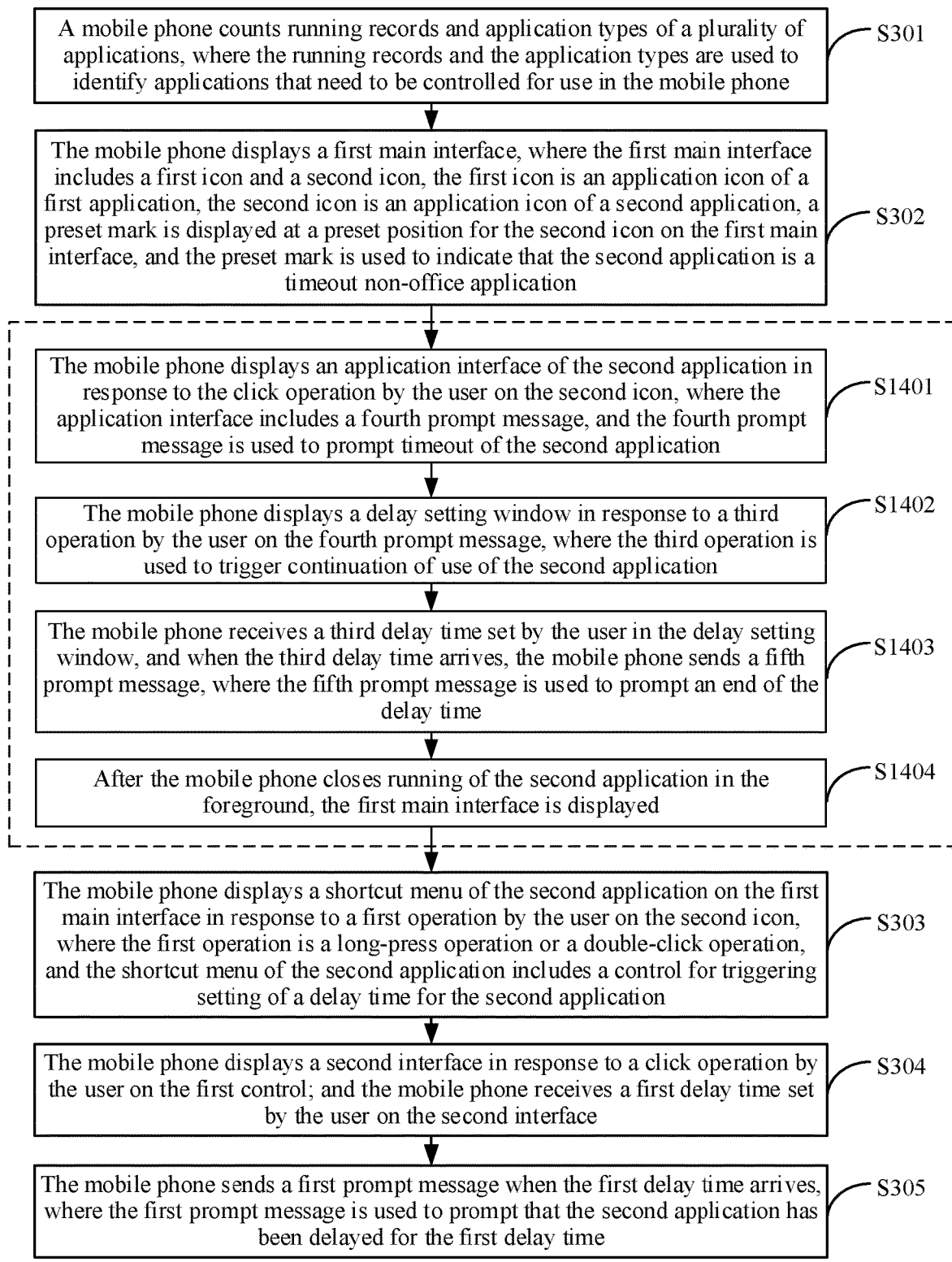
FIG. 14 is a flowchart of another method for controlling time-limited use of an application according to an embodiment of this application.

In some other embodiments, to perform a more comprehensive control for use of the second application, the following restriction mode is also provided for any second application: When the mobile phone detects that the user triggers use of the second application by clicking the second icon, the mobile phone dissuades the user from using the second application. For example, the mobile phone may receive a click operation by the user on the application icon 402 of the video application on the main interface shown in FIG. 4(A). The mobile phone dissuades the user from using the video application in response to the click operation by the user on the application icon 402. Specifically, as shown in FIG. 14, a process of triggering the dissuasion in response to the click operation by the user on the second icon includes S1401-S1403.

S1401: The mobile phone displays an application interface of the second application in response to the click operation by the user on the second icon, where the application interface includes a fourth prompt message, and the fourth prompt message is used to prompt timeout of the second application.

In this embodiment, while displaying the application interface of the second application, the fourth prompt message is also displayed in the application interface to dissuade the user from using the second application before entering the second application.

Figure 15:
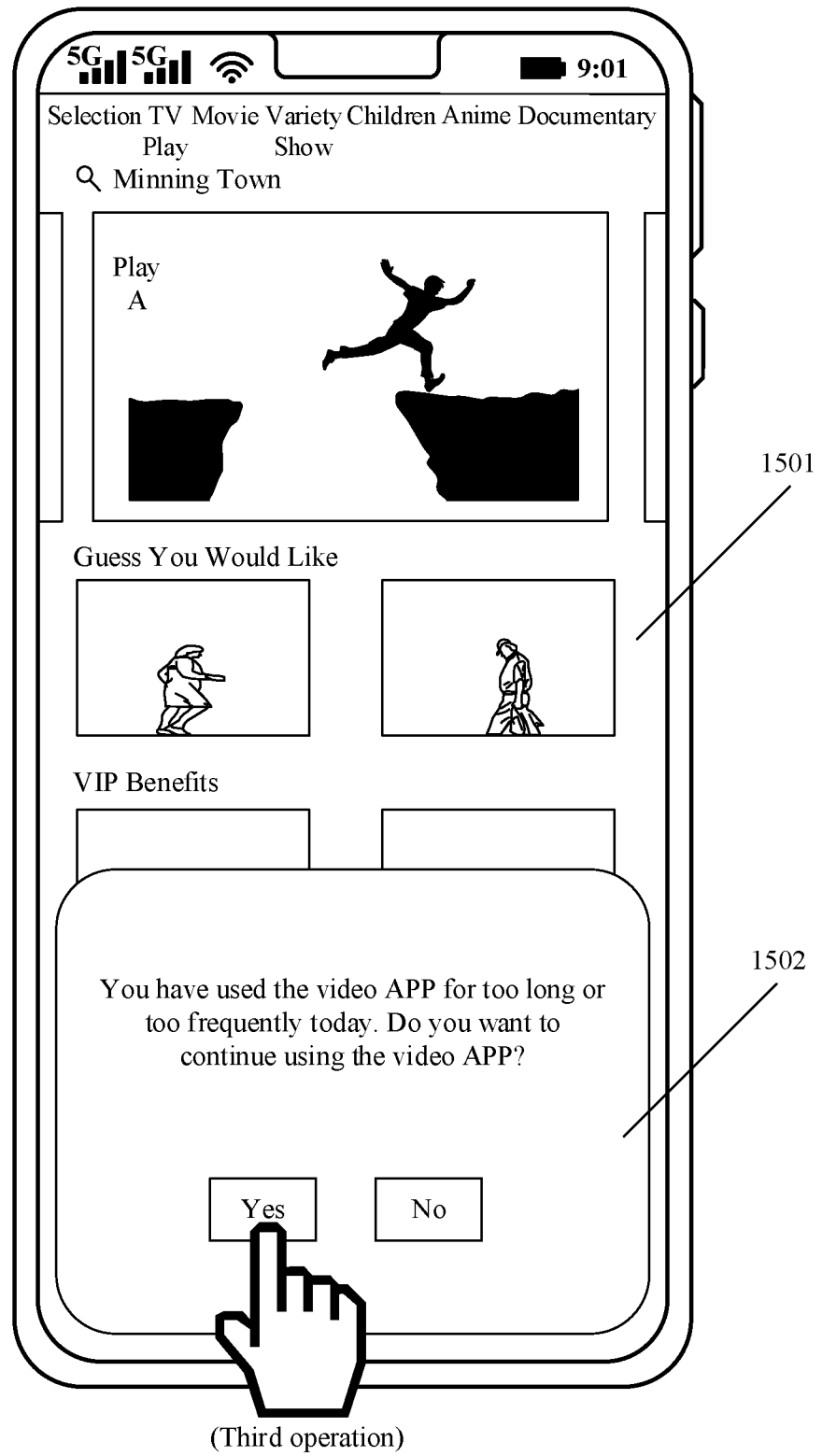
FIG. 15 is a schematic diagram of another display interface of a mobile phone according to an embodiment of this application.

For example, as shown in FIG. 15, a fourth prompt message 1502 is displayed on the application interface 1501. The fourth prompt message 1502 includes use of selection controls "Yes" and "No" for the user to trigger selection of whether to continue using the second application.

S1402: The mobile phone displays a delay setting window in response to a third operation by the user on the fourth prompt message, where the third operation is used to trigger continuation of use of the second application.

For example, the mobile phone receives a click operation by the user on a "Yes" button in the fourth prompt message 1502 on the application interface 1501 shown in FIG. 15, and the mobile phone displays an application interface 801 shown in FIG. 8 in response to the click operation by the user on the "Yes" button in the third prompt message 1502, where the application interface 801 includes a delay setting window 802.

S1403: The mobile phone receives a third delay time set by the user in the delay setting window, and when the third delay time arrives, the mobile phone sends a fifth prompt message, where the fifth prompt message is used to prompt an end of the delay time.

For changes in an interface in S1403, refer to FIG. 9 and FIG. 10, and related text descriptions thereof. Details are not described herein again.

The foregoing restriction mode in S1401-S1403 can be used separately after the second application is determined and the first main interface is displayed. Alternatively, the foregoing restriction mode may be used in combination with the control mode in FIG. 3, and in such a mode, S1404 is further included:

S1404: After the mobile phone closes running of the second application in the foreground, the first main interface is displayed.

After receiving an operation of the user to exit the second application, the mobile phone closes running of the second application in the foreground. For example, after the mobile phone receives a click operation by the user on a "NO" button in the first prompt message 1002 on the black screen interface 1001 shown in FIG. 10, the video application is closed. Alternatively, after the mobile phone automatically triggers a closing condition of the second application, running of the second application in the foreground is closed. For example, the mobile phone will automatically trigger closing of the video application after receiving a click operation by the user on a "Yes" button in the first prompt message 1002 on the black screen interface 1001 shown in FIG. 10, and a preset delay time (for example, 1 minute) arrives.

When used in combination, S1401-S1404 are performed between S302 and S303. Specifically, referring to FIG. 14, for any identified second application, after the mobile phone receives a click operation by the user on an application icon of the second application for the first time, the mobile phone performs S1401-S1404 to dissuade the user from using the second application (including setting a third delay time), and displays the first main interface after the second application exits running in the foreground. Thereafter, after the mobile phone receives the click operation by the user on the application icon of the second application, the user is no longer instructed to set the third delay time. In this scenario, the mobile phone may modify the delay time by performing S303-S305, that is, change the third delay time to the first delay time, and control for use of the second application by the user based on the modified first delay time.

According to this embodiment, in response to the click operation by the user on the application icon of the second application, the mobile phone triggers a dissuasion for the user from using the second application, rather than directly providing an application interface for use by the user, so as to more actively instruct the user to give up using the second application or use the second application within a limited time.

Figure 6B:
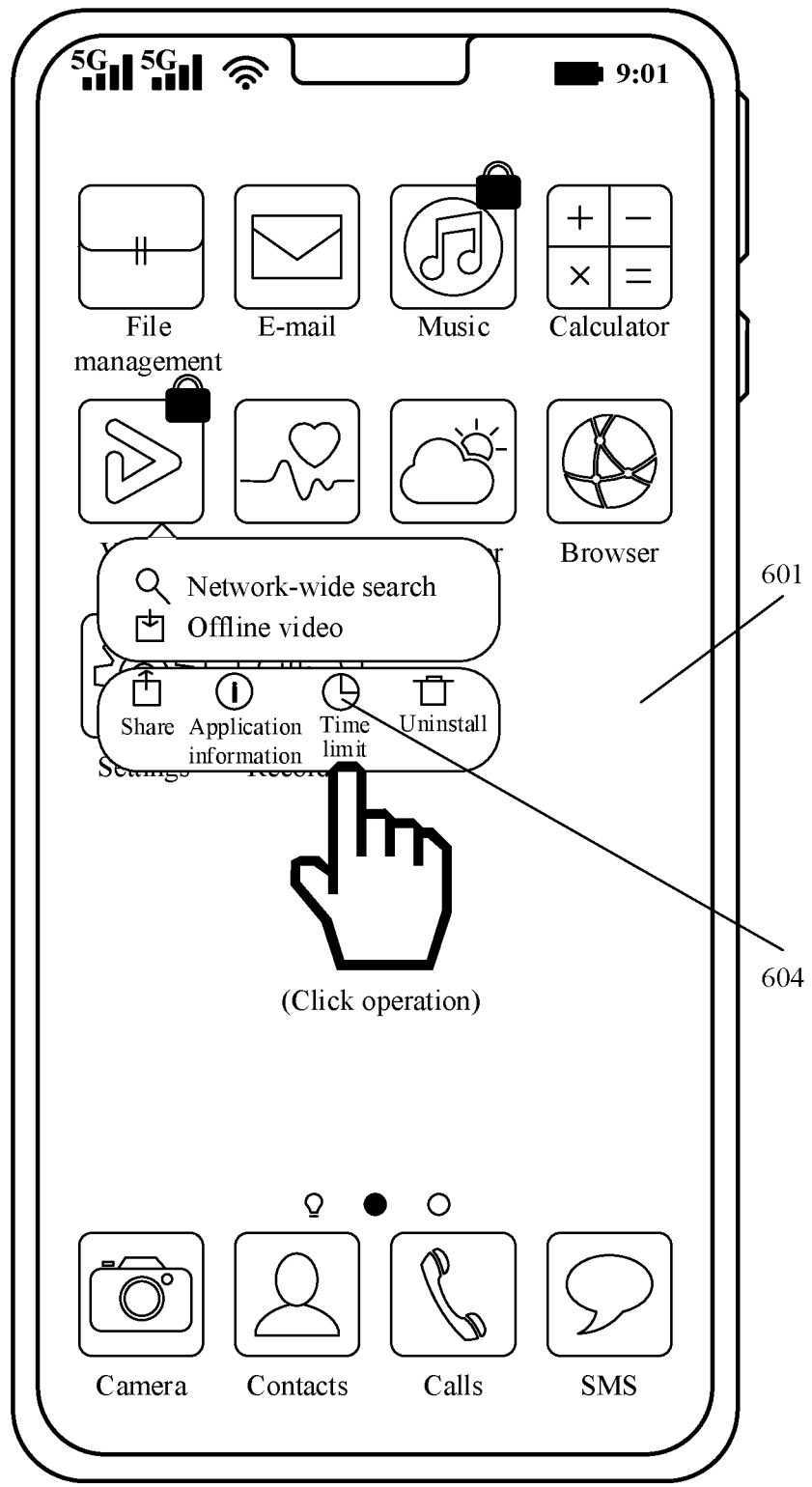

Finally, it should be noted here that in the foregoing description, a shortcut menu is directly displayed on the main interface of the mobile phone to describe a display of the shortcut menu. For example, as shown in FIG. 6(A) and FIG. 6(B), the shortcut menu of the second application is directly displayed on the first main interface 601. However, this embodiment of this application is not limited thereto.

In some other embodiments of this application, in response to a long-press operation or double-click operation by the user on an application icon, the mobile phone overlays and displays a layer having a preset transparency value on the main interface of the mobile phone, and further displays the application icon of the third application and the shortcut menu of the third application on the layer. The third application is an application operated by the long-press operation or the double-click operation. That is, the shortcut menu is displayed on the layer having the preset transparency value that is overlaid on the main interface of the mobile phone. Correspondingly, in this embodiment, that the mobile phone displays a shortcut menu of the second application on the first main interface in response to a first operation by the user on the second icon includes: the mobile phone overlays and displays a layer having a preset transparency value on the first main interface in response to the first operation by the user on the second icon, and further displays the application icon of the second application and the shortcut menu of the second application on the layer.

Figure 16:
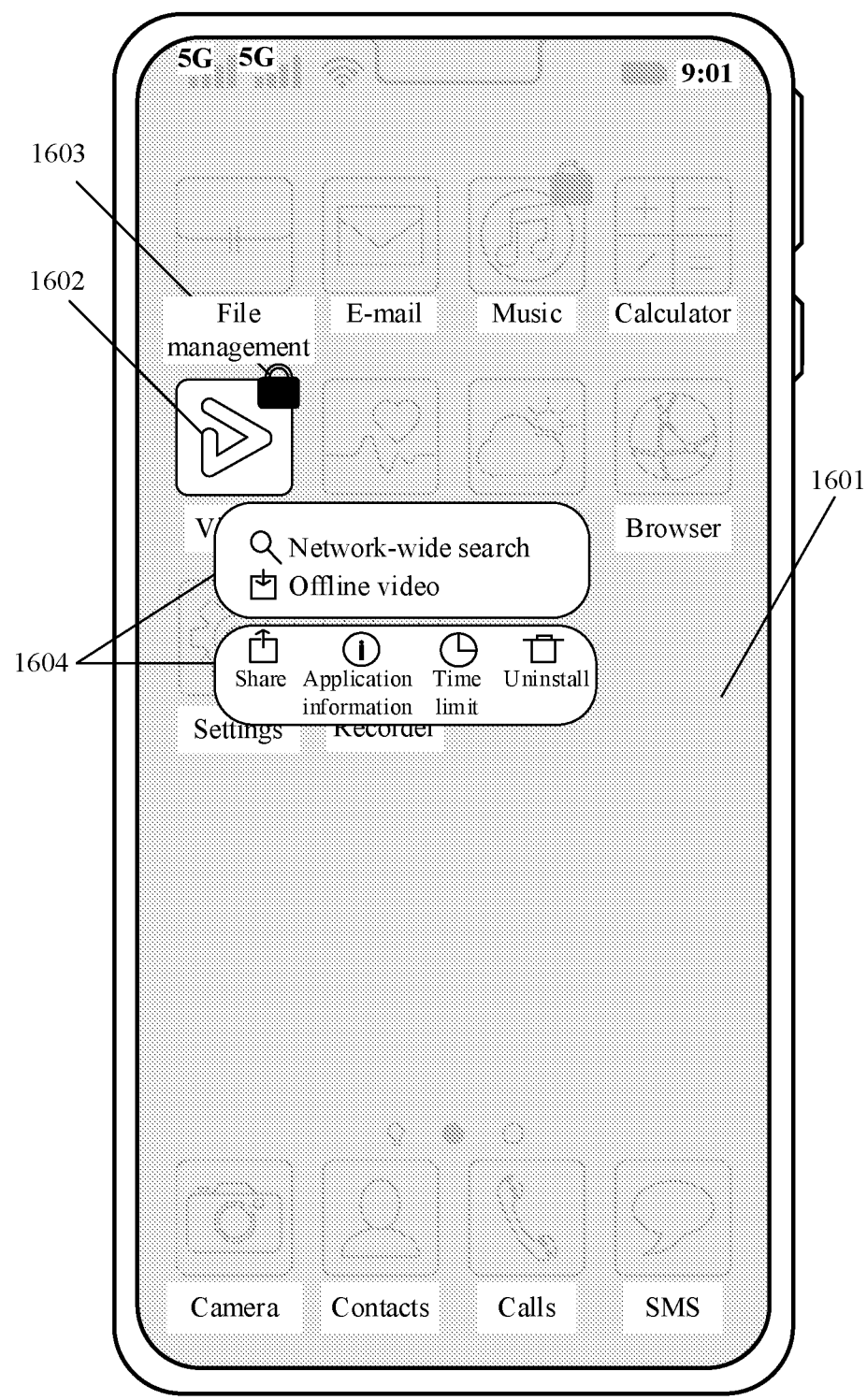
FIG. 16 is a schematic diagram of another display interface of a mobile phone according to an embodiment of this application.

For example, as shown in FIG. 16, the mobile phone overlays and displays a layer 1601 having a preset transparency value on the first main interface of the mobile phone in response to a long-press operation by the user on the application icon of the video application, and displays the application icon 1602, the lock mark 1603, and the shortcut menu 1604 of the video application on the layer 1601.

Some other embodiments of this application provide an electronic device, and the electronic device may include: the display (for example, a touchscreen), a memory, and one or more processors. The display and the memory are coupled to the processor. The memory is configured to store computer program code, and the computer program code includes a computer instruction. When the processor executes the computer instruction, the electronic device can perform the functions or steps performed by the mobile phone in the foregoing method embodiments. For a structure of the electronic device, refer to the structure of the electronic device 200 shown in FIG. 2.

Figure 17:
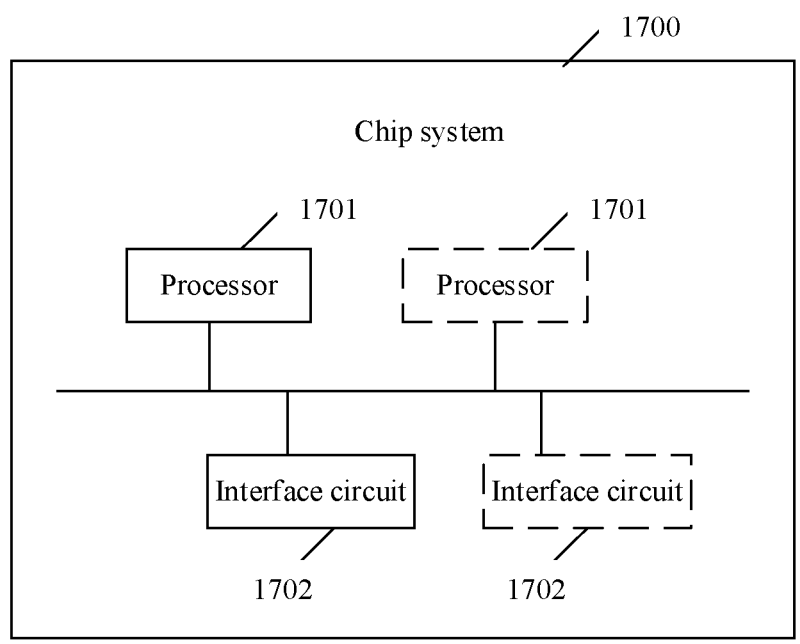
FIG. 17 is a schematic diagram of a structure of a chip system according to an embodiment of this application.

An embodiment of this application further provides a chip system. As shown in FIG. 17, the chip system 1700 includes at least one processor 1701 and at least one interface circuit 1702. The processor 1701 and the interface circuit 1702 may be interconnected by using a wire. For example, the interface circuit 1702 may be configured to receive a signal from another apparatus (for example, a memory of an electronic device). For another example, the interface circuit 1702 may be configured to send a signal to another apparatus (for example, the processor 1701). For example, the interface circuit 1702 may read an instruction stored in the memory and send the instruction to the processor 1701. When the instruction is executed by the processor 1701, the electronic device can be enabled to perform the steps in the foregoing embodiments. Certainly, the chip system may further include another discrete device. This is not specifically limited in this embodiment of this application.

An embodiment of this application further provides a computer storage medium. The computer storage medium includes computer instructions. When the computer instructions are run on the foregoing electronic device, the electronic device is enabled to perform the functions or steps performed by the mobile phone in the foregoing method embodiments.

An embodiment of this application further provides a computer program product. When the computer program product runs on a computer, the computer is enabled to perform the functions or steps performed by the mobile phone in the foregoing method embodiments.

The foregoing descriptions about implementations allow a person skilled in the art to clearly understand that, for the purpose of convenient and brief description, division of the foregoing functional modules is used only as an example for illustration. In actual application, the foregoing functions can be allocated to different functional modules and implemented according to needs, that is, an internal structure of an apparatus is divided into different functional modules to implement all or some of the functions described above.

In the several embodiments provided in this application, it should be understood that the disclosed apparatus and method may be implemented in other manners. For example, the foregoing apparatus embodiments are merely examples. For example, division into the modules or the units is merely logical function division and may be other division in an actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separate, and components displayed as units may be one or more physical units, that is, may be located in one place, or may be distributed in a plurality of different places. Some or all of the units may be selected according to actual needs to achieve the purpose of the solutions in the embodiments.

In addition, functional units in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in a form of a software product. The software product is stored in a storage medium, and includes several instructions for instructing a device (which may be a single-chip microcomputer, a chip, or the like) or a processor (processor) to perform all or some of the steps of the methods described in the embodiments of this application. The foregoing storage medium includes any medium that can store program code, such as a USB flash drive, a removable hard disk, a read only memory (read only memory, ROM), a random access memory (random access memory, RAM), a magnetic disk, or an optical disc.

The foregoing content is merely specific implementations of this application, but is not intended to limit the protection scope of this application. Any variation or replacement made within the technical scope disclosed in this application shall fall within the protection scope of this application. Therefore, the protection scope of this application shall be subject to the protection scope of the claims.

What is claimed is:

1. A method for controlling time-limited use of an application, wherein the method is applied to an electronic device in which a plurality of applications are installed, and the method comprises:
   displaying, by the electronic device, a first main interface, wherein the first main interface comprises a first icon and a second icon, the first icon is an application icon of a first application, the second icon is an application icon of a second application, a preset mark is displayed at a preset position of the second icon on the first main interface, and the preset mark indicates timeout of the second application;
   displaying, by the electronic device, a shortcut menu of the second application on the first main interface in response to a first operation of a user on the second icon, wherein the shortcut menu of the second application comprises a first control, the first control is configured to be used to trigger the electronic device to set a delay time for the second application, and the first operation is a long-press operation or a double-click operation;
   displaying, by the electronic device, a second interface in response to a click operation by the user on the first control;
   receiving, by the electronic device, a first delay time set by the user on the second interface; and
   sending, by the electronic device, a first prompt message when the first delay time arrives, wherein the first prompt message prompts that the second application has been delayed for the first delay time; and
   wherein the second application is determined by the electronic device from the plurality of applications based on running records and application types of the plurality of applications; the application types comprise office applications and non-office applications, and the running records comprise a running time and/or a quantity of running times of a corresponding application in the foreground of the electronic device in a preset time period as of the current time; the second application is a non-office application whose running time and/or quantity of running times in the foreground exceeds a preset threshold; and the first application is an application other than the second application among the plurality of applications.

2. The method according to claim 1, wherein:
   the second interface is:
   a main interface of the electronic device, and the second interface comprises a delay setting window for setting a delay time; or
   an application interface of the second application, and the second interface comprises a delay setting window for setting a delay time; and
   wherein the receiving, by the electronic device, a first delay time set by the user on the second interface comprises:
   receiving, by the electronic device, the first delay time set by the user in the delay setting window.

3. The method according to claim 1, wherein before the displaying, by the electronic device, a first main interface, the method further comprises:
- displaying, by the electronic device, a second main interface, wherein the second main interface comprises the second icon, and the preset mark is not displayed at a preset position for the second icon on the second main interface;
- displaying, by the electronic device, an application interface of the second application in response to a click operation by the user on the second icon on the second main interface; and
- displaying, by the electronic device, a third interface when a running time and/or a quantity of running times of the second application in the foreground in the preset time period as of the current time exceeds the preset threshold when the second application is running in the foreground, wherein the third interface prompts timeout of the second application; and
- wherein the displaying, by the electronic device, a first main interface comprises:
  - displaying, by the electronic device, the first main interface in response to a second operation of the user, wherein the second operation triggers the electronic device to run the second application in the background and to display the main interface of the electronic device.

4. The method according to claim 3, wherein the third interface comprises a delay setting window for setting a delay time; and the method further comprises:
- receiving, by the electronic device, a second delay time set by the user in the delay setting window on the third interface; and
- sending, by the electronic device, a second prompt message when the second delay time arrives, wherein the second prompt message prompts that the second application has been delayed for the second delay time.

5. The method according to claim 1, wherein the determining, by the electronic device, the second application from the plurality of applications based on use records and application types of the plurality of applications comprises:
- obtaining, by the electronic device, an application type of each of the plurality of applications from a cloud server, wherein the application types comprise office applications and non-office applications;
- counting, by the electronic device, a running time and/or a quantity of running times of each non-office application among the plurality of applications in the foreground in the preset time period; and
- when a running time and/or a quantity of running times of a first non-office application among the plurality of applications in the foreground in the preset time period as of the current time exceeds the preset threshold, determining that the first non-office application is the second application, wherein the first non-office application is any one of non-office applications among the plurality of applications.

6. The method according to claim 5, wherein that the running time and/or the quantity of running times exceeds the preset threshold comprises: the running time exceeds a preset threshold; and/or the quantity of running times exceeds a preset threshold.

7. The method according to claim 1, wherein after the displaying, by the electronic device, a first main interface, the method further comprises:
- displaying, by the electronic device, a shortcut menu of the first application on the first main interface in response to the first operation by the user on the first icon, wherein the shortcut menu of the first application does not comprise a control for triggering configured to be used to trigger the electronic device to set a delay time for the first application.

8. An electronic device, wherein a plurality of applications are installed in the electronic device, and the electronic device comprises a display, a memory, and one or more processors; the display and the memory are coupled to the processor; the memory is configured to store computer program code, and the computer program code comprises a computer instruction; and when the computer instruction is executed by the processor, the electronic device is enabled to perform the following steps:
- displaying a first main interface, wherein the first main interface comprises a first icon and a second icon, the first icon is an application icon of a first application, the second icon is an application icon of a second application, a preset mark is displayed at a preset position of the second icon on the first main interface, and the preset mark indicates timeout of the second application;
- displaying a shortcut menu of the second application on the first main interface in response to a first operation of a user on the second icon, wherein the shortcut menu of the second application comprises a first control, the first control is configured to be used to trigger the electronic device to set a delay time for the second application, and the first operation is a long-press operation or a double-click operation;
- displaying a second interface in response to a click operation by the user on the first control;
- receiving a first delay time set by the user on the second interface; and
- sending a first prompt message when the first delay time arrives, wherein the first prompt message prompts that the second application has been delayed for the first delay time; and
- wherein the second application is determined by the processor from the plurality of applications based on running records and application types of the plurality of applications; the application types comprise office applications and non-office applications, and the running records comprise a running time and/or a quantity of running times of a corresponding application in the foreground of the electronic device in a preset time period as of the current time; the second application is a non-office application whose running time and/or quantity of running times in the foreground exceeds a preset threshold; and the first application is an application other than the second application among the plurality of applications.

9. The electronic device according to claim 8, wherein: the second interface is:
- a main interface of the electronic device, and the second interface comprises a delay setting window for setting a delay time; or
- an application interface of the second application, and the second interface comprises a delay setting window for setting a delay time; and
- wherein when the computer instruction is executed by the processor, the electronic device is enabled to further perform the following step:
- receiving the first delay time set by the user in the delay setting window.

10. The electronic device according to c claim 8, wherein when the computer instruction is executed by the processor, the electronic device is enabled to further perform the following steps:
- displaying a second main interface before displaying the first main interface, wherein the second main interface comprises the second icon, and the preset mark is not displayed at a preset position of the second icon on the second main interface;
- displaying an application interface of the second application in response to a click operation by the user on the second icon on the second main interface; and
- displaying a third interface when a running time and/or a quantity of running times of the second application in the foreground in the preset time period as of the current time exceeds the preset threshold when the second application is running in the foreground, wherein the third interface prompts timeout of the second application; and
- when the computer instruction is executed by the processor, the electronic device is enabled to further perform the following step:
  - displaying, by the electronic device, the first main interface in response to a second operation of the user, wherein the second operation triggers the electronic device to run the second application in the background and to display the main interface of the electronic device.

11. The electronic device according to claim 10, wherein the third interface comprises a delay setting window for setting a delay time; and
- when the computer instruction is executed by the processor, the electronic device is enabled to further perform the following steps:
- receiving a second delay time set by the user in the delay setting window on the third interface; and
- sending a second prompt message when the second delay time arrives, wherein the second prompt message prompts that the second application has been delayed for the second delay time.

12. The electronic device according to claim 8 er 9, wherein when the computer instruction is executed by the processor, the electronic device is enabled to further perform the following steps:
- obtaining an application type of each of the plurality of applications from a cloud server, wherein the application types comprise office applications and non-office applications;
- counting a running time and/or a quantity of running times of each non-office application among the plurality of applications in the foreground in the preset time period; and
- when a running time and/or a quantity of running times of a first non-office application among the plurality of applications in the foreground in the preset time period as of the current time exceeds the preset threshold, determining that the first non-office application is the second application, wherein the first non-office application is any one of non-office applications among the plurality of applications.

13. The electronic device according to claim 12, wherein that the running time and/or the quantity of running times exceeds the preset threshold comprises: the running time exceeds a preset threshold; and/or the quantity of running times exceeds a preset threshold.

14. The electronic device according to claim 8, wherein when the computer instruction is executed by the processor, the electronic device is enabled to further perform the following step:
- after displaying the first main interface, displaying a shortcut menu of the first application on the first main interface in response to the first operation by the user on the first icon, wherein the shortcut menu of the first application does not comprise a control configured to be used to trigger the electronic device to set a delay time for the first application.

15. A computer-readable storage medium, wherein an instruction is stored in the computer-readable storage medium, and when the instruction is executed on an electronic device, the electronic device is enabled to perform the method according to claims 1.

16. The electronic device according to claim 9, wherein when the computer instruction is executed by the processor, the electronic device is enabled to further perform the following step:
- after displaying the first main interface, displaying a shortcut menu of the first application on the first main interface in response to the first operation by the user on the first icon, wherein the shortcut menu of the first application does not comprise a control configured to be used to trigger the electronic device to set a delay time for the first application.

17. The electronic device according to claim 9, wherein when the computer instruction is executed by the processor, the electronic device is enabled to further perform the following steps:
- obtaining an application type of each of the plurality of applications from a cloud server, wherein the application types comprise office applications and non-office applications;
- counting a running time and/or a quantity of running times of each non-office application among the plurality of applications in the foreground in the preset time period; and
- when a running time and/or a quantity of running times of a first non-office application among the plurality of applications in the foreground in the preset time period as of the current time exceeds the preset threshold, determining that the first non-office application is the second application, wherein the first non-office application is any one of non-office applications among the plurality of applications.

18. The electronic device according to claim 9, wherein when the computer instruction is executed by the processor, the electronic device is enabled to further perform the following steps:
- displaying a second main interface before displaying the first main interface, wherein the second main interface comprises the second icon, and the preset mark is not displayed at a preset position of the second icon on the second main interface;
- displaying an application interface of the second application in response to a click operation by the user on the second icon on the second main interface; and
- displaying a third interface when a running time and/or a quantity of running times of the second application in the foreground in the preset time period as of the current time exceeds the preset threshold when the second application is running in the foreground, wherein the third interface is used to prompt timeout of the second application; and when the computer instruction is executed by the processor, the electronic device is enabled to perform the following step:

displaying the first main interface in response to a second operation of the user, wherein the second operation triggers the electronic device to run the second application in the background and to display the main interface of the electronic device.

19. The method according to claim 2, wherein after the displaying, by the electronic device, a first main interface, the method further comprises:

displaying, by the electronic device, a shortcut menu of the first application on the first main interface in response to the first operation by the user on the first icon, wherein the shortcut menu of the first application does not comprise a control for triggering the electronic device to set a delay time for the first application.

20. The method according to claim 2, wherein the determining, by the electronic device, the second application from the plurality of applications based on use records and application types of the plurality of applications comprises:

obtaining, by the electronic device, an application type of each of the plurality of applications from a cloud server, wherein the application types comprise office applications and non-office applications;

counting, by the electronic device, a running time and/or a quantity of running times of each non-office application among the plurality of applications in the foreground in the preset time period; and when a running time and/or a quantity of running times of a first non-office application among the plurality of applications in the foreground in the preset time period as of the current time exceeds the preset threshold, determining that the first non-office application is the second application, wherein the first non-office application is any one of non-office applications among the plurality of applications.

* * * * *

UNITED STATES PATENT AND TRADEMARK OFFICE
CERTIFICATE OF CORRECTION

PATENT NO. : 12,498,972 B2
APPLICATION NO. : 18/031048
DATED : December 16, 2025
INVENTOR(S) : Zhao Zhao Page 1 of 1

It is certified that error appears in the above-identified patent and that said Letters Patent is hereby corrected as shown below:

In the Claims

In Column 28, in Claim 7, Line 3, after "control" delete "for triggering".

In Column 29, in Claim 12, Line 43, delete "8 er 9," and insert -- 8, --.

In Column 30, in Claim 15, Line 16, delete "claims" and insert -- claim --.

Signed and Sealed this
Tenth Day of February, 2026

John A. Squires
*Director of the United States Patent and Trademark Office*